United States Patent [19]

Bracewell

[11] Patent Number: 4,646,256
[45] Date of Patent: Feb. 24, 1987

[54] COMPUTER AND METHOD FOR THE DISCRETE BRACEWELL TRANSFORM

[75] Inventor: Ronald N. Bracewell, Stanford, Calif.

[73] Assignee: The Board of Trustees of the Leland Stanford Junior University, Palo Alto, Calif.

[21] Appl. No.: 590,885

[22] Filed: Mar. 19, 1984

[51] Int. Cl.$^4$ ............................................. G06F 15/31
[52] U.S. Cl. ................................................ 364/725
[58] Field of Search ....................... 364/725, 726, 727

[56] References Cited

U.S. PATENT DOCUMENTS

| | | | |
|---|---|---|---|
| 3,821,527 | 6/1974 | Kang | 364/727 |
| 4,093,994 | 6/1978 | Nvssbaumer | 364/726 |
| 4,156,920 | 5/1979 | Winograd | 364/726 |
| 4,385,363 | 5/1983 | Widergren et al. | 364/725 |

OTHER PUBLICATIONS

Cochran et al, "What is the Fast Fourier Transform?"-*Proceedings of the IEEE* vol. 55, No. 10, Oct. 1967, pp. 1664–1674.

Kolba et al "A Prime Factor FFT Algorithm Using High-Speed Convolution" *IEEE Trans. on Acoustics Speech & Signal Processing* vol. ASSP-25, No. 4, Aug. 1977, pp. 281–294.

Cooley et al "An Algorithm for the Machine Calculation of Complex Fourier Series" *Math of Computation* vol. 19, Apr. 1965, pp. 297–301.

Bracewell, *The Fourier Transform and its Applications* McGraw-Hill, Inc. 2nd Ed. 1978, p. 179.

*Primary Examiner*—David H. Malzahn
*Attorney, Agent, or Firm*—Fliesler, Dubb, Meyer & Lovejoy

[57] ABSTRACT

Disclosed is a special purpose computer and method of computation for performing an N-length real-number discrete transform. For a real-valued function $f(\tau)$ where $\tau$ has the values $0,1,\ldots,(N-1)$, the Discrete Bracewell Transform (DBT) $H(\nu)$ is as follows:

$$H(\nu) = (N^{-1}) \sum_{\tau=0}^{N-1} f(\tau)\text{cas}(2\pi\nu\tau/N)$$

where, $$\nu = 0,1,\ldots,N-1$$

$$\text{cas}\,\theta \equiv \cos\theta + \sin\theta.$$

The DBT is performed without need for employing real and imaginary parts, and in efficient embodiments, is executed efficiently and in less time than the Discrete Fourier Transform (DFT). The process steps for the original transform and the inverse retransformation are the same.

41 Claims, 3 Drawing Figures

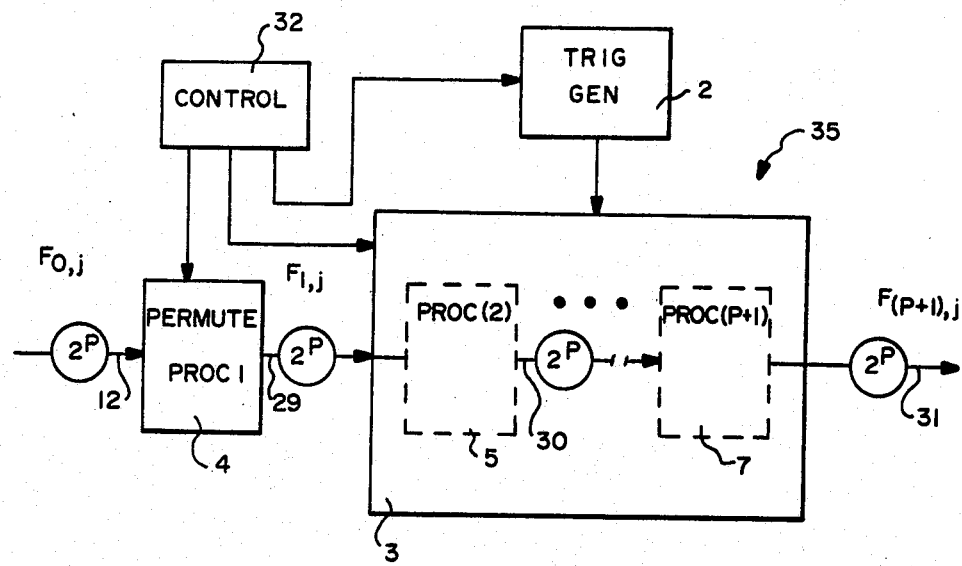
FIG. —1
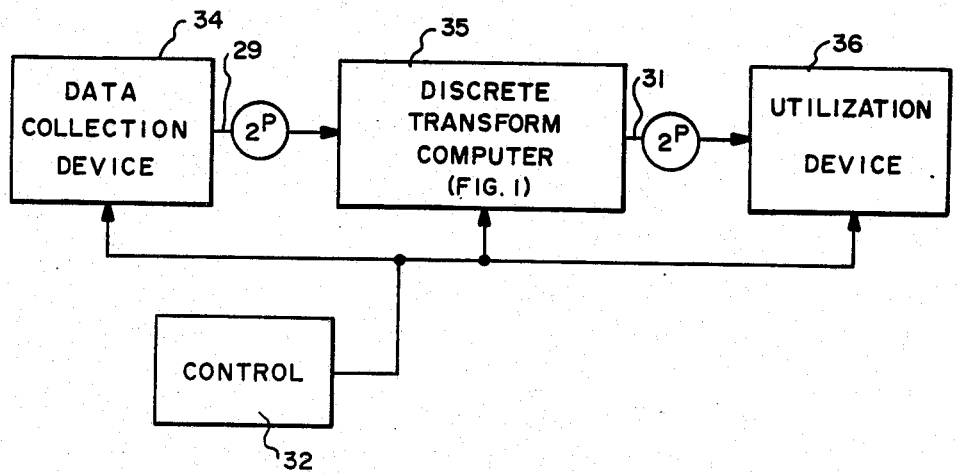
FIG. —2

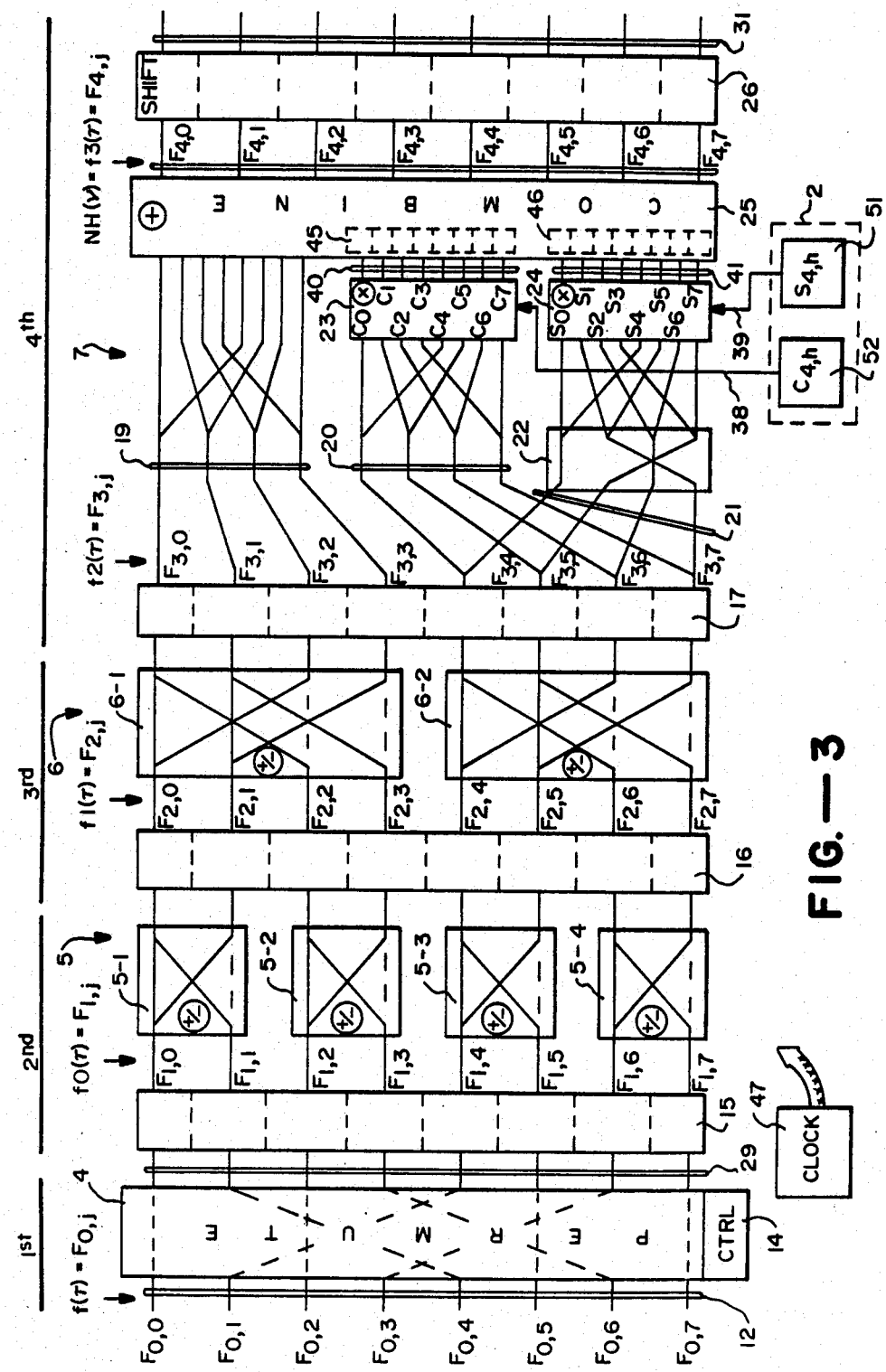
FIG.—3

COMPUTER AND METHOD FOR THE DISCRETE BRACEWELL TRANSFORM

BACKGROUND OF THE INVENTION

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

This invention relates generally to the field of digital data processing apparatus and more specifically to a computer for performing a discrete transform on input data.

The Fourier transform has been well know to mathematicians, scientists, engineers and others for many years. The Fourier transform is a tool used in many fields such as medicine, economics, and engineering to analyze data.

For example, when the input data represents time-varying electrical signals, the Fourier transform is often performed to identify the frequency components within the electrical signals. Similarly, an inverse Fourier transform is often performed to produce a time-varying electrical signal from frequency components. In addition, data may be processed by first performing the Fourier transform, modifying the frequency components in a desired way, and inverting the transform.

For general background, reference is made to the book "The Fourier Transform and its Applications" McGraw-Hill, Inc., 2nd Ed. 1978 by Ronald N. Bracewell.

In digital data processing apparatus, the Fourier transform is normally performed with discrete values of input data in accordance with the well-known discrete Fourier transform (DFT) defined as follows:

$$X(k) = \sum_{n=0}^{N-1} x(n)e^{-i(2\pi/N)nk}$$

The inverse Fourier transform is performed by substituting "i" for "−i" in the discrete Fourier transform. In the DFT transform, N values of the input data x(n) [where n is equal to 0, 1, ..., (N−1)] are transformed to produce N values of output data X(k), where k is equal to 0, 1, ..., (N−1). The number N of values of input data may vary, but the larger the value of N the greater the resolution of the output data. Transforms in accordance with the above equation are called N-point or N-length DFT's. In order to practically and efficiently perform N-length DFT's, digital computers are utilized. Even using digital computers, however, performance of N-length DFT's for large N is still a formidable task. For this reason, many prior art techniques have been developed to more efficiently perform the N-length discrete Fourier transform.

One significant technique for improving the efficiency of performing the discrete Fourier transform is described in the article by J. W. Cooley and J. W. Tukey, "An Algorithm for the Machine Calculation of Complex Fourier Series", *Math of Computation*, Vol. 19, pp. 297-301, April 1965. When the Cooley-Tukey algorithm was utilized on a general purpose computer, a more than fifty times improvement in processing time occurred for 1024-point DFT. The Cooley-Tukey algorithm is known as the fast Fourier transform (FFT) and is a radix-2 algorithm.

General background information concerning the fast Fourier transform (FFT) and variations thereof are described in the article "What is the Fast Fourier Transform?", *Proceedings of the IEEE*, Vol 55, No. 10, October 1967, Cochran et. al., pp. 1664-1674. The FFT method of computing the N-length DFT relies upon selecting the transform length N as a power of 2. The calculations are grouped in pairs to achieve a significant reduction in the calculation time required for the N-length DFT.

Many other algorithms have been proposed for more efficiently performing the N-length DFT. A number of such algorithms, including the nested Winograd algorithm, are described and compared in the article "A Prime Factor FFT Algorithm Using A High-Speed Convolution" by Kolba and Parks, *IEEE Transactions on Acoustics Speech and Signal Processing*, Vol ASSP-25, No. 4, August 1977, pp. 281-294. In the prime factor FFT by Kolba and Parks, the transform length N is selected equal to the product of a number of mutually prime factors $N_1, N_2, \ldots, N_i, \ldots, N_L$. Each of the prime factors $N_i$ of N is employed in an $N_i$-length DFT using convolution. In the Kolba and Parks prime factor FFT, L different and shorter length DFT's are executed in order to achieve the N-point DFT. The Kolba and Parks prime factor FFT compares favorably with the radix-2 algorithm of Cooley-Tukey and the nested algorithm of Winograd (U.S. Pat. No. 4,156,920).

While various techniques, such as those described above, have significantly improved the efficiency of performing the N-length discrete Fourier transform (DFT), even greater increases in efficiency are desirable.

The discrete Fourier transform (DFT) has two characteristics that are sometimes computationally undesirable. The inverse DFT is not identical with the direct DFT transform and so it is necessary to keep track of the +i and −i versions. Also, the DFT has complex rather than real values and thus requires provision for complex arithmetic and separately managed storage for real and imaginary parts. In many applications, both real and imaginary parts are not required and hence the calculations using both tend to be inefficient.

More efficient acquisition of complex Fourier coefficients is possible in the case of real data by a modification of the FFT algorithm. Conversely, complex inputs may be handled more efficiently, in the cases where it is known that the results should be real, by a different modified algorithm. Both of these modifications, derived from the FFT, must occupy storage space in computer memory when real data are to be processed by (i) transformation followed by (ii) operations carried out in the transform domain, and (iii) retransformation into the data domain.

While other linear integral transforms have been proposed, none heretofore have been implementable as discrete transforms suitable for use as improvements over the Discrete Fourier Transform. For example, as referred to by Bracewell, *The Fourier Transform and its Applications*, on page 179, Hartley is credited with linear integral transforms (Hartley Transforms), but these have not been available as discrete transforms nor have algorithms been available to implement them.

In view of the above background of the invention, there is a need for economical computers and methods for more efficiently performing and inverting N-point discrete transforms and particularly for computers which avoid unneeded complex computations when only real computations are desired.

SUMMARY OF THE INVENTION

The present invention is a special purpose computer and method of computation for performing an N-length real-number discrete transform. For a real-valued function $f(\tau)$ where $\tau$ has the values $0, 1, \ldots, (N-1)$, the Discrete Bracewell Transform $H(\nu)$ in accordance with the present invention is as follows:

$$H(\nu) = (N^{-1}) \sum_{\tau=0}^{N-1} f(\tau) \text{cas}(2\pi\nu\tau/N)$$

where, $\nu = 0, 1, \ldots, N-1$ $\text{cas } \theta \equiv \cos \theta + \sin \theta$.

The Discrete Bracewell Transform can be arrived at by performing the multiplications and summation indicated by the formula but the efficiency is improved by means of a Fast Bracewell Transform (FBT), which proceeds by a plurality of stages. The first stage receives an input sequence of N input data values, $F_{0,j}$, which are given for values of j from 0 to $N-1$ as follows:

$F_{0,j} = F_{0,0}, \ldots, F_{0,(N-1)}$.

The first stage permutes the order of the input sequence using a bisecting permutation. The bisecting permutation is carried out, for example, by sorting the original sequence into odd-numbered and even-numbered elements thereby bisecting the original sequence into two segments, an odd segment and an even segment. The elements are then reordered with the odd-segment first followed by the even-segment. The new sequence in turn, has each segment odd-even bisected and reordered to form a new sequence. The odd-even bisecting and reordering is performed $P-1$ times for N-length data when $N = 2^P$. The permutation thus performed is called a bisecting permutation and results in a sequence of N permuted data values, $F_{1,j}$, which are given for values of j from 0 to $N-1$ as follows:

$F_{1,j} = F_{1,0}, \ldots, F_{1,(N-1)}$.

After the permutation stage, the transform is completed in P subsequent stages. Each of the P subsequent stages evaluates N equations of a form that in general adds three terms where one term includes a value directly from the previous stage, another term includes a value from the previous stage multiplied by a cosine term, and another term includes a value from the previous stage multiplied by a sine term.

Two of the P subsequent stages after the permuting stage may be implemented using sum and difference calculations without need for explicit multiplication by cosine or sine factors.

In accordance with the above summary, the present invention provides an improved special-purpose computer and method of computation for performing an N-length real-number discrete transform without need for employing real and imaginary parts. In efficient embodiments of the present invention, the Discrete Bracewell Transform (DBT) is executed efficiently and in less time than the Discrete Fourier Transform (DFT).

Additional objects and features of the invention will appear from the following description in which the preferred embodiments of the invention have been set forth in detail in conjunction with the drawings.

BRIEF DESCRIPTION OF THE DRAWINGS

FIG. 1 is a schematic block diagram of a discrete transform computer for performing the Discrete Bracewell Transform.

FIG. 2 is a data processing system employing the discrete transform computer of FIG. 1.

FIG. 3 is a more detailed block diagram of one implementation of the FIG. 1 computer.

DETAILED DESCRIPTION

General

The Discrete Bracewell Transform (DBT) is a linear discrete transform that is as a means of obtaining an approximation to the Hartley transform (HT). The DBT is a new entity not previously available.

The Fast Bracewell Transform (FBT) is a new method for arriving at the Discrete Bracewell Transform (DBT). The FBT transforms data given in the form of, or reducible to, an ordered finite set of real numbers.

The DBT and the FBT are transforms that are particularly useful for digital spectral analysis and convolution and these may be used in procedures that are widely practiced in many branches of technology including engineering, medicine, geophysics and statistics. The FBT exhibits desirable features of convenience and speed. The FBT is suitable for any application to which the Fast Fourier Transform (FFT) can be put and has superior convenience and speed in many applications.

Discrete Transform Computer—FIG. 1

A discrete transform computer is shown for performing the Discrete Bracewell Transform. The computer receives an ordered finite set of real numbers on input lines 12. The ordered set includes N numbers where N is equal to $2^P$ and where P is a positive integer. The input values of data on lines 12 are permuted in the permute processor 4 (PROC 1). The permute processor 4 permutes the input numbers on lines 12 using an odd-even bisecting and reordering permutation (bisecting permutation) hereinafter described in further detail.

The input sequence of numbers on lines 12 is denominated $F_{0,j}$ and the output sequence on lines 29 from the permute processor 4 is denominated $F_{1,j}$. In FIG. 1, a processor 3 receives the permuted sequence $F_{1,j}$ on lines 29 and provides the transformed output $F_{(P+1),j}$ on output lines 31.

In FIG. 1, the processor 3 includes the P processor stages PROC (2), ..., PROC (P+1). The PROC (2) stage 5. is the first stage and the PROC (P+1) stage 7 is the last stage. Each of the stages PROC (2), ..., PROC (P+1) processes an N-valued input sequence from the previous stage to form an N-valued output sequence. Each stage, s, for s equal to values from 2 to P+1 calculates N values of $F_{s,j}$ for j equal to values from 0 to $N-1$. Each value of $F_{s,j}$ for the s stage is calculated as a function of direct values from the previous $s-1$ stage, as a function of values from the previous $s-1$ stage multiplied by a cosine factor, and as a function of values from the previous s−1 stage multiplied by a a sine factor.

The trigonometric values of the sine and cosine factors, when required, are provided in the FIG. 1 computer by the trig generator 2. The N-valued transform output appears on lines 31.

In FIG. 1, the control 32 provides timing and other control signals to the generator 2 and processors 3 and 4 to cause them to perform the desired transform.

Application System—FIG. 2

In FIG. 2, an application system for utilizing the discrete transform computer 35 of FIG. 1 is shown. In the FIG. 2 system, the data collection device 34 is, for example, a radar device which provides N samples of radar data during each time frame. Control 32 provides clocking and framing signals in a conventional manner to clock and frame the input radar data samples. The N radar data samples, for each frame period, are input to the discrete transform computer 35 The discrete transform computer 35 transforms the input radar data samples and forms, on the output lines 31, the Discrete Bracewell Transformed values. The transformed values are provided as an input to the utilization device 36. Utilization device 36 receives the transformed values, one set of N values for each frame, and executes recongnition calculations based upon the transformed values in order to determine the nature of the radar signals provided by the data collection device 34. In this manner, the FIG. 2 apparatus provides a radar detection apparatus which can operate in real time.

A further understanding of the transform by the discrete transform computer 35 can be obtained with reference to a mathematical derivation of the Discrete Bracewell Transform.

Mathematical Derivation

Given a real function $f(\tau)$ for $\tau = 0, 1, \ldots, (N-1)$ the Discrete Bracewell Transform $H(\nu)$ of the present invention is as follows:

$$H(\nu) = (N^{-1}) \sum_{\tau=0}^{N-1} f(\tau) \text{cas}(2\pi\nu\tau/N) \qquad \text{Eq. (1)}$$

where, $\nu = 0, 1, \ldots, N-1$ $\text{cas } \theta \equiv \cos \theta + \sin \theta$.

The inverse DBT is as follows:

$$f(\tau) = \sum_{\nu=0}^{N-1} H(\nu) \text{cas}(2\pi\nu\tau/N), \qquad \text{Eq. (2)}$$

where, $\tau = 0, 1, \ldots, N-1$.

The symbol $\tau$ can be thought of as a mnemonic for time, while $\nu/N$ is like frequency measured in cycles per unit of time.

In order to perform the transform of Eq. (1), the sequence of input data is permuted by odd/even sorting and reordering until two-element data pairs are reached.

To superpose all the two-element transforms requires a decomposition formula that expresses the DBT of a given sequence in terms of the DBTs of subsequences of half length. This formula permits, for example, the DBT of a four element sequence [$a_1$ $a_2$ $b_1$ $b_2$] to be expressed in terms of the DBTs of the two interleaved two-element sequences [$a_1$ $b_1$] and [$a_2$ $b_2$]. To derive the decomposition formula two theorems are employed, the shift theorem and the similarity theorem.

The shift theorem stages that if $f(\tau)$ has DBT $H(\nu)$ then the DBT of $F(\tau + a)$ is as follows:

$$DBT = H(\nu) \cos (2\pi a\nu/N) - H(N-\nu) \sin (2\pi a\nu/N). \qquad \text{Eq. (3)}$$

The similarity theorem states that if a sequence $f(\tau)$ is stretched to double its length by inserting a zero element after each given element then the elements of the original DBT are repeated. As examples, the sequence [1 2 3 4] has DBT [2.5 −1 −0.5 0] and the sequence [1 0 2 0 3 0 4 0] has DBT [2.5 −1 −0.5 0 2.5 −1 −0.5 0].

Using these theorems, the general decomposition formula is as follows:

$$H(\nu) = H_{a1}(\nu) + H_{a2}(\nu) \cos (2\pi\nu/N) + H_{a2}(N-\nu) \sin (2\pi\nu/N) \qquad \text{Eq. (4)}$$

where $H_{a1}(\nu)$ and $H_{a2}(\nu)$ are respectively the $\frac{1}{2}$N-element transforms of the $a_1$ and $a_2$ sequences, but with the elements repeated to double the length. In the derivation of Eq. (4), $a = 1$ is used in the shift theorem.

Computation

In order to perform DBT computations, N data elements $F_{s,j}$ are processed in $P+1$ stages. The stages are identified by the s subscript and the sequence location for each data element is identified by the subscript j.

$F_{s,j}$ = real valued element
s = stage = 0, . . . , (P+1)
j = element number = 0, 1, . . . , (N−1)
N = number data elements
$N = 2^P$ where P is a positive integer In Stage 0, (s=0) The sequence of N input data values $F_{0,j}$ are given for all values of j from 0 to N−1 as follows:

$F_{0,j} = F_{0,0}, \ldots, F_{0,(N-1)}$.

In Stage 1 (s=1), the $F_{0,j}$ input data elements of Stage 0 are permuted using a bisecting permutation.

The bisecting permutation rearranges the sequence of data by placing the $F_{0,j}'$ member in Stage 0 into the $F_{1,j}$ position in Stage 1. The value of $j'$ is calculated from j, for example, by executing the routine of CHART 1 for all N values of j. In the following CHART 1, j is represented by J and $j'$ is represented by J1.

CHART 1

| | |
|---|---|
| 10 | R = J |
| 20 | J1 = 0 |
| 30 | FOR K = 1 TO P |
| 40 | S = R DIV 2 |
| 50 | J1 = J1 + J1 + R − S − S |
| 60 | R = S |
| 70 | NEXT K |

Examples of the calculations called for by CHART 1 are set forth in the following CHART 2 for the values $F_{1,0}$; $F_{1,1}$; $F_{1,2}$; and $F_{1,3}$ for a sixteen element (N=16, P=4) sequence.

CHART 2

| K | R | S | j' | $F_{1,j} = F_{0,j'}$ |
|---|---|---|----|----|
| 1 | j = 0 | 0 | 0 | |
| 2 | 0 | 0 | 0 | |
| 3 | 0 | 0 | 0 | |
| 4 | 0 | 0 | 0 | $F_{1,0} = F_{0,0}$ |
| 1 | j = 1 | 0 | 1 | |
| 2 | 0 | 0 | 2 | |
| 3 | 0 | 0 | 4 | |
| 4 | 0 | 0 | 8 | $F_{1,1} = F_{0,8}$ |
| 1 | j = 2 | 1 | 0 | |
| 2 | 1 | 0 | 1 | |
| 3 | 0 | 0 | 2 | |
| 4 | 0 | 0 | 4 | $F_{1,2} = F_{0,4}$ |
| 1 | j = 3 | 1 | 1 | |
| 2 | 1 | 0 | 3 | |
| 3 | 0 | 0 | 6 | |
| 4 | 0 | 0 | 12 | $F_{1,3} = F_{0,12}$ |

Using the bisecting permutation described, the permuted data elements for a sixteen element example are set forth in TABLE 1.

TABLE 1

(Stage 1)

$F_{1,0} = F_{0,0}$
$F_{1,1} = F_{0,8}$
$F_{1,2} = F_{0,4}$
$F_{1,3} = F_{0,12}$
$F_{1,4} = F_{0,2}$
$F_{1,5} = F_{0,10}$
$F_{1,6} = F_{0,6}$
$F_{1,7} = F_{0,14}$
$F_{1,8} = F_{0,1}$
$F_{1,9} = F_{0,9}$
$F_{1,10} = F_{0,5}$
$F_{1,11} = F_{0,13}$
$F_{1,12} = F_{0,3}$
$F_{1,13} = F_{0,11}$
$F_{1,14} = F_{0,7}$
$F_{1,15} = F_{0,15}$

In each of the subsequent stages (s equal to 2, ..., T) after the permute Stage 1, the N values of $F_{s,j}$ for each stage are formed by evaluating N equations for each stage. Each equation is essentially of the following form:

$$F_{s,j} = [F_{s-1,e} + (F_{s-1,f})(C_{s,h}) + (F_{s-1,g})(S_{s,h})]_q \quad \text{Eq. (5)}$$

where,
N = number of data elements = $2^P$
s = stage number = 2, ..., T
T = total number of stages = P+1
Q = N/(2E) = number of pairs of sets of equations in a stage
q = 0,1, ..., (Q−1)
E = $2^{s-2}$ = number of equations in each set of each pair
e = [0+(2E)(q)], ..., [(E−1)+(2E)(q)]
f = e+E
g = f when h = 0 and also when f = f]$_{h=0}$
g = K−f when h≠0 where K is a constant equal to (2g]$_{h=0}$+E
h = 0, ..., (2E−1)
  for first set of pair h=0, ... (2E−1)
  for second set of pair h=0, ..., (2E−1)
j = p+h = 0,1, ..., (N−1)

$$C_{s,h} = \cos(2\pi h/2^{s-1}) \quad \text{Eq. (6)}$$
$$S_{s,h} = \sin(2\pi h/2^{s-1}) \quad \text{Eq. (7)}$$

Eq. (5) is used to form N equations for each stage. Each stage s uses the data values of the previous stage (s−1) to form new data values. The output $F_{T,j}$ from the final stage (s=T) is the desired transform of the input data $F_{0,j}$. Note that Eq. (5) is of the same form as Eq. (4) and represents one manner of evaluating Eq. (4).

The stages 2 through T form the N equations as a function of the number N of data elements and of the particular stage. By way of example, the sixteen value (N=16) example of TABLE 1 will be described for stages 2 through 5. For that 16-element example, some of the parameters for Eqs. 5, 6, and 7 are given in the following CHART 3. The CHART 3 parameters are used to form the equations of TABLE 2, ..., TABLE 5.

CHART 3

|  | s | E | Q |
|---|---|---|---|
| TABLE | 2 | 1 | 4 |
| TABLE | 3 | 2 | 2 |
| TABLE | 4 | 4 | 1 |
| TABLE | 5 | 8 | 0 |

In Stage 2, there are eight pairs (Q=8; q=0,1, ..., 7) of sets of equations with one (E=1) equation per set. The N equations for $F_{2,j}$ are set forth in TABLE 2.

TABLE 2

(Stage 2)

| q | $F_{2,j}$ | = | $F_{1,e}$ | + | $(F_{1,f})$ | $(C_{2,h})$ | + | $(F_{1,g})$ | $(S_{2,h})$ |
|---|---|---|---|---|---|---|---|---|---|
| 0 | $F_{2,0}$ | = | $F_{1,0}$ | + | $(F_{1,1})$ | $(C_{2,0})$ | + | $(F_{1,1})$ | $(S_{2,0})$ |
| 0 | $F_{2,1}$ | = | $F_{1,0}$ | + | $(F_{1,1})$ | $(C_{2,1})$ | + | $(F_{1,1})$ | $(S_{2,1})$ |
| 1 | $F_{2,2}$ | = | $F_{1,2}$ | + | $(F_{1,3})$ | $(C_{2,0})$ | + | $(F_{1,3})$ | $(S_{2,0})$ |
| 1 | $F_{2,3}$ | = | $F_{1,2}$ | + | $(F_{1,3})$ | $(C_{2,1})$ | + | $(F_{1,3})$ | $(S_{2,1})$ |
| 2 | $F_{2,4}$ | = | $F_{1,4}$ | + | $(F_{1,5})$ | $(C_{2,0})$ | + | $(F_{1,5})$ | $(S_{2,0})$ |
| 2 | $F_{2,5}$ | = | $F_{1,4}$ | + | $(F_{1,5})$ | $(C_{2,1})$ | + | $(F_{1,5})$ | $(S_{2,1})$ |
| 3 | $F_{2,6}$ | = | $F_{1,6}$ | + | $(F_{1,7})$ | $(C_{2,0})$ | + | $(F_{1,7})$ | $(S_{2,0})$ |
| 3 | $F_{2,7}$ | = | $F_{1,6}$ | + | $(F_{1,7})$ | $(C_{2,1})$ | + | $(F_{1,7})$ | $(S_{2,1})$ |
| 4 | $F_{2,8}$ | = | $F_{1,8}$ | + | $(F_{1,9})$ | $(C_{2,0})$ | + | $(F_{1,9})$ | $(S_{2,0})$ |
| 4 | $F_{2,9}$ | = | $F_{1,8}$ | + | $(F_{1,9})$ | $(C_{2,1})$ | + | $(F_{1,9})$ | $(S_{2,1})$ |
| 5 | $F_{2,10}$ | = | $F_{1,10}$ | + | $(F_{1,11})$ | $(C_{2,0})$ | + | $(F_{1,11})$ | $(S_{2,0})$ |
| 5 | $F_{2,11}$ | = | $F_{1,10}$ | + | $(F_{1,11})$ | $(C_{2,1})$ | + | $(F_{1,11})$ | $(S_{2,1})$ |
| 6 | $F_{2,12}$ | = | $F_{1,12}$ | + | $(F_{1,13})$ | $(C_{2,0})$ | + | $(F_{1,13})$ | $(S_{2,0})$ |
| 6 | $F_{2,13}$ | = | $F_{1,12}$ | + | $(F_{1,13})$ | $(C_{2,1})$ | + | $(F_{1,13})$ | $(S_{2,1})$ |
| 7 | $F_{2,14}$ | = | $F_{1,14}$ | + | $(F_{1,15})$ | $(C_{2,0})$ | + | $(F_{1,15})$ | $(S_{2,0})$ |
| 7 | $F_{2,15}$ | = | $F_{1,14}$ | + | $(F_{1,15})$ | $(C_{2,1})$ | + | $(F_{1,15})$ | $(S_{2,1})$ |

In Stage 3, there are four pairs (Q=4; q=0,1 ..., 3) of sets of equations with two equations (E=2) per set (e=0,1; 4,5; 8,9; 12,13). The N equations for $F_{3,j}$ are set forth in TABLE 3.

TABLE 3

(Stage 3)

| q | $F_{3,j}$ | = | $F_{2,e}$ | + | $(F_{2,f})$ | $(C_{3,h})$ | + | $(F_{2,g})$ | $(S_{3,h})$ |
|---|---|---|---|---|---|---|---|---|---|
| 0 | $F_{3,0}$ | = | $F_{2,0}$ | + | $(F_{2,2})$ | $(C_{3,0})$ | + | $(F_{2,2})$ | $(S_{3,0})$ |
| 0 | $F_{3,1}$ | = | $F_{2,1}$ | + | $(F_{2,3})$ | $(C_{3,1})$ | + | $(F_{2,3})$ | $(S_{3,1})$ |
| 0 | $F_{3,2}$ | = | $F_{2,0}$ | + | $(F_{2,2})$ | $(C_{3,2})$ | + | $(F_{2,2})$ | $(S_{3,2})$ |
| 0 | $F_{3,3}$ | = | $F_{2,1}$ | + | $(F_{2,3})$ | $(C_{3,3})$ | + | $(F_{2,3})$ | $(S_{3,3})$ |
| 1 | $F_{3,4}$ | = | $F_{2,4}$ | + | $(F_{2,6})$ | $(C_{3,0})$ | + | $(F_{2,6})$ | $(S_{3,0})$ |
| 1 | $F_{3,5}$ | = | $F_{2,5}$ | + | $(F_{2,7})$ | $(C_{3,1})$ | + | $(F_{2,7})$ | $(S_{3,1})$ |
| 1 | $F_{3,6}$ | = | $F_{2,4}$ | + | $(F_{2,6})$ | $(C_{3,2})$ | + | $(F_{2,6})$ | $(S_{3,2})$ |
| 1 | $F_{3,7}$ | = | $F_{2,5}$ | + | $(F_{2,7})$ | $(C_{3,3})$ | + | $(F_{2,7})$ | $(S_{3,3})$ |
| 2 | $F_{3,8}$ | = | $F_{2,8}$ | + | $(F_{2,10})$ | $(C_{3,0})$ | + | $(F_{2,10})$ | $(S_{3,0})$ |
| 2 | $F_{3,9}$ | = | $F_{2,9}$ | + | $(F_{2,11})$ | $(C_{3,1})$ | + | $(F_{2,11})$ | $(S_{3,1})$ |
| 2 | $F_{3,10}$ | = | $F_{2,8}$ | + | $(F_{2,10})$ | $(C_{3,2})$ | + | $(F_{2,10})$ | $(S_{3,2})$ |
| 2 | $F_{3,11}$ | = | $F_{2,9}$ | + | $(F_{2,11})$ | $(C_{3,3})$ | + | $(F_{2,11})$ | $(S_{3,3})$ |
| 3 | $F_{3,12}$ | = | $F_{2,12}$ | + | $(F_{2,14})$ | $(C_{3,0})$ | + | $(F_{2,14})$ | $(S_{3,0})$ |
| 3 | $F_{3,13}$ | = | $F_{2,13}$ | + | $(F_{2,15})$ | $(C_{3,1})$ | + | $(F_{2,15})$ | $(S_{3,1})$ |
| 3 | $F_{3,14}$ | = | $F_{2,12}$ | + | $(F_{2,14})$ | $(C_{3,2})$ | + | $(F_{2,14})$ | $(S_{3,2})$ |
| 3 | $F_{3,15}$ | = | $F_{2,13}$ | + | $(F_{2,15})$ | $(C_{3,3})$ | + | $(F_{2,15})$ | $(S_{3,3})$ |

In Stage 4, there are two pairs (Q=2; q=0,1) sets of equations with four equations (E=4) per set (E=0,1,2,3; 8,9,10,11). The N equations for $F_{4,j}$ are set forth in TABLE 4.

TABLE 4

(Stage 4)

| q | $F_{4,j}$ | = | $F_{3,e}$ | + | $(F_{3,f})$ | $(C_{4,h})$ | + | $(F_{3,g})$ | $(S_{4,h})$ |
|---|---|---|---|---|---|---|---|---|---|
| 0 | $F_{4,0}$ | = | $F_{3,0}$ | + | $(F_{3,4})$ | $(C_{4,0})$ | + | $(F_{3,4})$ | $(S_{4,0})$ |
| 0 | $F_{4,1}$ | = | $F_{3,1}$ | + | $(F_{3,5})$ | $(C_{4,1})$ | + | $(F_{3,7})$ | $(S_{4,1})$ |
| 0 | $F_{4,2}$ | = | $F_{3,2}$ | + | $(F_{3,6})$ | $(C_{4,2})$ | + | $(F_{3,6})$ | $(S_{4,2})$ |
| 0 | $F_{4,3}$ | = | $F_{3,3}$ | + | $(F_{3,7})$ | $(C_{4,3})$ | + | $(F_{3,5})$ | $(S_{4,3})$ |
| 0 | $F_{4,4}$ | = | $F_{3,0}$ | + | $(F_{3,4})$ | $(C_{4,4})$ | + | $(F_{3,4})$ | $(S_{4,4})$ |
| 0 | $F_{4,5}$ | = | $F_{3,1}$ | + | $(F_{3,5})$ | $(C_{4,5})$ | + | $(F_{3,7})$ | $(S_{4,5})$ |
| 0 | $F_{4,6}$ | = | $F_{3,2}$ | + | $(F_{3,6})$ | $(C_{4,6})$ | + | $(F_{3,6})$ | $(S_{4,6})$ |
| 0 | $F_{4,7}$ | = | $F_{3,3}$ | + | $(F_{3,7})$ | $(C_{4,7})$ | + | $(F_{3,5})$ | $(S_{4,7})$ |
| 1 | $F_{4,8}$ | = | $F_{3,8}$ | + | $(F_{3,12})$ | $(C_{4,0})$ | + | $(F_{3,12})$ | $(S_{4,0})$ |
| 1 | $F_{4,9}$ | = | $F_{3,9}$ | + | $(F_{3,13})$ | $(C_{4,1})$ | + | $(F_{3,15})$ | $(S_{4,1})$ |
| 1 | $F_{4,10}$ | = | $F_{3,10}$ | + | $(F_{3,14})$ | $(C_{4,2})$ | + | $(F_{3,14})$ | $(S_{4,2})$ |
| 1 | $F_{4,11}$ | = | $F_{3,11}$ | + | $(F_{3,15})$ | $(C_{4,3})$ | + | $(F_{3,13})$ | $(S_{4,3})$ |
| 1 | $F_{4,12}$ | = | $F_{3,8}$ | + | $(F_{3,12})$ | $(C_{4,4})$ | + | $(F_{3,12})$ | $(S_{4,4})$ |
| 1 | $F_{4,13}$ | = | $F_{3,9}$ | + | $(F_{3,13})$ | $(C_{4,5})$ | + | $(F_{3,15})$ | $(S_{4,5})$ |
| 1 | $F_{4,14}$ | = | $F_{3,10}$ | + | $(F_{3,14})$ | $(C_{4,6})$ | + | $(F_{3,14})$ | $(S_{4,6})$ |
| 1 | $F_{4,15}$ | = | $F_{3,11}$ | + | $(F_{3,15})$ | $(C_{4,7})$ | + | $(F_{3,13})$ | $(S_{4,7})$ |

In Stage 5, there is one pair (Q=1; q=0) of sets of equations with eight (E=8) equations per set (e=0,1,..., 7). The N equations for $F_{5,j}$ are given in TABLE 5.

TABLE 5

(Stage 5)

| q | $F_{5,j}$ | = | $F_{4,e}$ | + | $(F_{4,f})$ | $(C_{5,h})$ | + | $(F_{4,g})$ | $(S_{5,h})$ |
|---|---|---|---|---|---|---|---|---|---|
| 0 | $F_{5,0}$ | = | $F_{4,0}$ | + | $(F_{4,8})$ | $(C_{5,0})$ | + | $(F_{4,8})$ | $(S_{4,0})$ |
| 0 | $F_{5,1}$ | = | $F_{4,1}$ | + | $(F_{4,9})$ | $(C_{5,1})$ | + | $(F_{4,15})$ | $(S_{5,1})$ |
| 0 | $F_{5,2}$ | = | $F_{4,2}$ | + | $(F_{4,10})$ | $(C_{5,2})$ | + | $(F_{4,14})$ | $(S_{5,2})$ |
| 0 | $F_{5,3}$ | = | $F_{4,3}$ | + | $(F_{4,11})$ | $(C_{5,3})$ | + | $(F_{4,13})$ | $(S_{5,3})$ |
| 0 | $F_{5,4}$ | = | $F_{4,4}$ | + | $(F_{4,12})$ | $(C_{5,4})$ | + | $(F_{4,12})$ | $(S_{5,4})$ |
| 0 | $F_{5,5}$ | = | $F_{4,5}$ | + | $(F_{4,13})$ | $(C_{5,5})$ | + | $(F_{4,11})$ | $(S_{5,5})$ |
| 0 | $F_{5,6}$ | = | $F_{4,6}$ | + | $(F_{4,14})$ | $(C_{5,6})$ | + | $(F_{4,10})$ | $(S_{5,6})$ |
| 0 | $F_{5,7}$ | = | $F_{4,7}$ | + | $(F_{4,15})$ | $(C_{5,7})$ | + | $(F_{4,9})$ | $(S_{5,7})$ |
| 0 | $F_{5,8}$ | = | $F_{4,0}$ | + | $(F_{4,8})$ | $(C_{5,8})$ | + | $(F_{4,8})$ | $(S_{5,8})$ |
| 0 | $F_{5,9}$ | = | $F_{4,1}$ | + | $(F_{4,9})$ | $(C_{5,9})$ | + | $(F_{4,15})$ | $(S_{5,9})$ |
| 0 | $F_{5,10}$ | = | $F_{4,2}$ | + | $(F_{4,10})$ | $(C_{5,10})$ | + | $(F_{2,14})$ | $(S_{5,10})$ |
| 0 | $F_{5,11}$ | = | $F_{4,3}$ | + | $(F_{4,11})$ | $(C_{5,11})$ | + | $(F_{2,13})$ | $(S_{5,11})$ |
| 0 | $F_{5,12}$ | = | $F_{4,4}$ | + | $(F_{4,12})$ | $(C_{5,12})$ | + | $(F_{2,12})$ | $(S_{5,12})$ |
| 0 | $F_{5,13}$ | = | $F_{4,5}$ | + | $(F_{4,13})$ | $(C_{5,13})$ | + | $(F_{2,11})$ | $(S_{5,13})$ |
| 0 | $F_{5,14}$ | = | $F_{4,6}$ | + | $(F_{4,14})$ | $(C_{5,14})$ | + | $(F_{2,10})$ | $(S_{5,14})$ |
| 0 | $F_{5,15}$ | = | $F_{4,7}$ | + | $(F_{4,15})$ | $(C_{5,15})$ | + | $(F_{2,9})$ | $(S_{5,15})$ |

The values of $F_{5,j}$ determined in Stage 5 and defined in TABLE 5 represent the Discrete Bracewell Transform (DBT) of the $F_{0,j}$ data sequence, $F_{0,0}, F_{0,1}, \ldots, F_{0,15}$. While the DBT can be performed by calculating values for each of the equations in TABLE 1, ..., TABLE 5, certain improvements are possible in order to speed the operation and thereby forming a Fast Bracewell Transform (FBT).

A characteristic feature of the equations is the presence of retrograde indexing as for example in TABLE 5 in the $F_{4,g}S_{5,h}$ terms $F_{4,15}S_{5,1}$, $F_{4,14}S_{5,2}$, $F_{4,13}S_{5,3}$, $F_{4,12}S_{5,4}$, where a diminishing index in one factor accompanies a rising index in the other that is, the indexes g and h change in opposite directions.

Fast Bracewell Transform (FBT)

The FBT takes an ordered data set of N real numbers and performs sequentially the operations in CHART 4 to obtain the DBT.

CHART 4

STAGE 1
(a) Permutation.
STAGE 2
(b) Summing and differencing.
(c) Interleaving.

CHART 4-continued

STAGE 3
(d) Three parallel selection operations.
(e) Two parallel modulation operations.
(f) Combining.
SUBSEQUENT STAGES
(g) Return to (d).
(h) Completion.

It is assumed that the number of data elements N is one of the numbers such as 4, 8, 16, 32, . . . , that is, $N=2^P$ where P is a integer. To handle other situations, padding of artificial data (adding 0's) is applied to bring the total number of elements to a total $N=2^P$. Then, the steps (a) through (h) of CHART 4 are performed.

(a) Permutation

The N data elements are rearranged in order in a bisecting permutation according to the following rules. Remove the second, fourth, sixth and all even-numbered element from the original sequence of elements thereby leaving the odd-numbered elements and place the even-numbered elements in their same order, at the end of the odd-numbered elements to form a new reordered sequence. For example, if the elements of an original data sequence are [abcdefgh] then the odd-even sorting and reordering yields a new sequence [acegbdfh]. The new sequence is bisected into the segments [aceg] and [bdfh]. Each segment is odd-even sorted and reordered. The rearrangement is repeated until the number of rearrangements reaches a total number R. The number R is arrived at as follows. Let $N=2^P$ as stipulated. Then R is one less than P. For example, if $N=8=2^3$, then R (the number of rearrangements) is 2. The segment [aceg] is rearranged as [aecg] and the segment [bdfh] is rearranged as [bfdh] so that the completed bisecting permutation is [acegbfdh] in the N=8 example described.

(b) Summing and Differencing

Summing means add the first and second elements [a+e] of the permuted sequence to form the first element of a sum sequence. The second element of the sum sequence is formed by adding the third and fourth elements of the permuted sequence and so on forming [b+f] and [d+h]. Differencing means subtracting the second from the first element [a−e] of the permuted sequence to form the first element of a difference sequence. The second element of the difference sequence is formed by subtracting the fourth from the third element [c−g] of the permuted sequence and so on to form [b−f] and [d−h] in the example described.

(c) Interleaving

An interleaved sequence is formed by taking elements alternately from the sum and difference sequences, starting with the first element of the sum sequence. In the example described in the interleaved sequence is

[(a+e)(a−e)(b+f)(b−f)(c+g)(c−g)(d+h)(d−h)].

(d) Selection

The interleaved sequence is now subjected to three selection operations that will result in three new sequences A, B and C.

In Sequence A, retain the first two elements of the interleaved sequence, discard the next two, retain the next two, discard the next two, and so on, leaving gaps where the elements were discarded. Fill the two-element gaps by copying the preceding two elements into each gap. For example, if the interleaved sequence at the end of Stage 2 were [abcdefgh] then the discarding would result in [abef] and sequence A would be [ababefef].

In Sequence B, discard the first two elements of the interleaved sequence, retain the next two, discard the next two, retain the next two, and so on. Fill the gaps by copying the following two elements into each gap. Sequence B would be [cdcdghgh].

In Sequence C, of Stage 3, sequence C is the same as sequence B.

(e) Modulation

Sequence B is modulated by multiplying the first four elements in turn by the Eq. (6) cosine factors $C_{3,0}=1$, $C_{3,1}=0$, $C_{3,2}=-1$, $C_{3,3}=0$. This modulation is merely a brief way of saying, "Retain the first element, discard the second, reverse the sign of the third, discard the fourth." The four factors are applied to the next four elements and so on until all the elements of sequence B have been modulated. Sequence C is modulated by the Eq. (7) sine factors $S_{3,0}=0$, $S_{3,1}=1$, $S_{3,2}=0$, $S_{3,3}=-1$ in the same way.

(f) Combining

The three separate sequences, sequence A and the two sequences formed from sequences B and C by modulation are now combined by addition, element by element. This completes Stage 3.

(g) Return to (d)

Stage 4 consists of repeating the operations described above under (d) Selection, (e) Modulation and (f) Combining but with the following differences.

(i) In the selection instructions for obtaining sequences A and B replace "two" by "four". In subsequent stages, replace "four" by "eight" and so on.

(ii) In Stage 4, there will be eight cosine factors $C_{4,0}$, $C_{4,1}$, $C_{4,2}$, ..., $C_{4,7}$ and eight sine factors $S_{4,0}$, $S_{4,1}$, $S_{4,2}$, ..., $S_{4,7}$ to be applied to the first and later groups of eight elements until all the elements of sequences B and C respectively are exhausted.

These cosine and sine factors are $C_{4,0}=1$, $C_{4,1}=r$, $C_{4,2}=0$, $C_{4,3}=-r$, $C_{4,4}=-1$, $C_{4,5}=-r$, $C_{4,6}=0$, $C_{4,7}=r$; $S_{4,0}=0$, $S_{4,1}=r$, $S_{4,2}=1$, $S_{4,3}=-r$, $S_{4,4}=0$, $S_{4,5}=-r$, $S_{4,6}=-1$, $S_{4,7}=-r$, where r is the square root of 0.5.

In subsequent stages these factors may be arrived at by the Eq. (6) and Eq. (7) formulas $$C_{s,n}=\cos(2\pi n/2^{s-1})$$

$$S_{s,n}=\sin(2\pi n/2^{s-1})$$

where $n=0,1,2,\ldots,(2^{s-1}-1)$ and s is the number of the stage.

It is necessary to return to (d) a certain number of times which is determined as follows. If $N=8$ there is no return to (d). If $N=16$ there is one return. If $N=32,64,\ldots$ the number of returns is $2,3,\ldots$. If $N=4$ the FBT procedure is complete at the end of Stage 2.

(h) Completion

The final ordered sequence of real numbers constitutes the DBT of the data sequence as arrived at by the FBT procedure.

Other Embodiments

The formulas for $S_{s,n}$ and $C_{s,n}$ mentioned above may be used for calculating the factors used in Stage 4. When Stage 4 is reached, the eight factors may be (i) calculated directly from the formulas, or (ii) the factors may be precalculated together with those needed for later stages. Variant (i) has the advantage of shortening the instruction set and therefore reducing the necessary storage space in memory. Variant (ii) has the advantage of increased speed in arriving at the result.

In CHART 4, on the completion of STAGE 3, the next instruction is "Return to (d)." However, a gain in speed may be obtained by delaying the return. Under this variant, STAGE 4 is executed in a way that is analogous to STAGE 3 but incorporates the 16 factors $C_{4,0}$ ... $C_{4,7}$ and $S_{4,0}$ ... $S_{4,7}$ directly into the instruction set.

Conversely, STAGE 3 itself may be eliminated by advancing the return. This advance leads to further savings in the length of the instruction set but also leads to the lapse of more time before the results are arrived at.

A further increase in speed is possible with a combined two-staged delayed return. The whole of the column of equations in TABLE 2 (Stage 2) can be eliminated as follows. For example, the equation $F_{2,0}+F_{2,2}=F_{3,0}$ at the head of Stage 3 can be rewritten $F_{1,0}+F_{1,1}+F_{1,2}+F_{1,3}=F_{3,0}$ by direct substitution from Stage 2, and so on for the rest of the equations in Stage 3.

Matrix Formulation

A condensed representation of the DBT is obtained by formulating the eighty equations of TABLE 1 through TABLE 5 in matrix form. We may write $$[H]=N^{-1}[L_p][L_{p-1}]\ldots[L_1][P][f] \qquad \text{Eq. (b 8)}$$

where [H] is the N-element column matrices representing the data $f(\tau)$, [H] is the Discrete Bracewell Transform $H(\nu)$, [P] is the bisecting permutation matrix and the $[L_i]$ (where i equals $P, P-1, \ldots, 1$) are matrix operators which convert the column matrix operand to the column matrix of level i. In the example with $N=16$ and $P=4$, i runs from 1 to 4. A subsequent step of conversion to the discrete Fourier transform $F(\nu)$ may also be represented by the (complex) matrix multiplication, $$[F]=[\phi][H] \qquad \text{Eq. (9)}$$

Combining Eq. (8) and Eq. (9) a new expression for the discrete Fourier transform is obtained as follows:

$$[F]=N^{-1}[\phi][L_pL_{p-1}\ldots L_1][P][f]. \qquad \text{Eq. (10)}$$

The matrix operator $N^{-1}[\phi][L_p \ldots L_1][P]$ thus represents a new factorization of the DFT matrix operator [W], where $[F]=[W][f]$, $[W]=\exp(-i2\pi/N)$ and [W] is given by the following TABLE 6.

A characteristic feature of the FHT operators $L_3$, $L_4$, ... is the presence of retrograde indexing of the terms containing sine factors as revealed by elements lying on diagonals that run in the opposite direction to the main diagonal.

The factors, which are directly verifiable from TABLE 1 through TABLE 5, are given in the following TABLE 7 through TABLE 12.

TABLE 6

$$W = \begin{bmatrix} 1 & 1 & 1 & & & & \\ 1 & W & W^2 & & & & \\ 1 & W^2 & W^4 & & & & \\ & & & \ddots & & & \\ & & & & W^{(N-3)2} & W^{(N-3)(N-2)} & W^{(N-1)(N-3)} \\ & & & & W^{(N-2)(N-3)} & W^{(N-2)2} & W^{(N-2)(N-1)} \\ & & & & W^{(N-1)(N-3)} & W^{(N-1)(N-2)} & W^{(N-1)2} \end{bmatrix}$$

TABLE 7

$$P = \begin{bmatrix} 1 & & & & 1 & & & \\ & 1 & & & & & 1 & \\ & & 1 & & & & & \\ & & & 1 & & & & 1 \\ 1 & & & & & 1 & & \\ & 1 & & & & & & \\ & & 1 & & & & 1 & \\ & & & 1 & & & & 1 \end{bmatrix}$$

TABLE 8

$$L_1 = \begin{bmatrix} 1 & 1 & & & & & & \\ 1 & -1 & & & & & & \\ & & 1 & 1 & & & & \\ & & 1 & -1 & & & & \\ & & & & 1 & 1 & & \\ & & & & 1 & -1 & & \\ & & & & & & 1 & 1 \\ & & & & & & 1 & -1 \end{bmatrix}$$

TABLE 9

$$L_2 = \begin{bmatrix} 1 & 1 & & & & & & \\ & & 1 & 1 & & & & \\ 1 & -1 & & & & & & \\ & & 1 & -1 & & & & \\ & & & & 1 & 1 & & \\ & & & & & & 1 & 1 \\ & & & & 1 & -1 & & \\ & & & & & & 1 & -1 \end{bmatrix}$$

TABLE 10

$$L_3 = \begin{bmatrix} 1 & C_0 & & & & \\ 1 & C_1 & S_1 & & & \\ 1 & K_2 & & & & \\ 1 & S_3 & C_3 & & & \\ 1 & C_4 & & & & \\ 1 & C_5 & S_5 & & & \\ 1 & K_6 & & & & \\ 1 & S_7 & C_7 & & & \\ & & & 1 & C_0 & \\ & & & 1 & C_1 & S_1 \\ & & & 1 & K_2 & \\ & & & 1 & S_3 & C_3 \\ & & & 1 & C_4 & \\ & & & 1 & C_5 & S_5 \\ & & & 1 & K_6 & \\ & & & 1 & S_7 & C_7 \end{bmatrix}$$

TABLE 11

$$L_4 = \begin{bmatrix} 1 & C_0 & & \\ 1 & C_1 & & S_1 \\ 1 & C_2 & & S_2 \\ 1 & C_3 & & S_3 \\ 1 & K_4 & & \\ 1 & S_5 & & C_5 \\ 1 & S_6 & & C_6 \\ 1 & S_7 & & C_7 \\ 1 & K_8 & & \\ 1 & C_9 & & S_9 \\ 1 & C_{10} & & S_{10} \\ 1 & C_{11} & & S_{11} \\ 1 & K_{12} & & \\ 1 & S_{13} & & C_{13} \\ 1 & S_{14} & & C_{14} \\ 1 & S_{15} & & C_{15} \end{bmatrix}$$

TABLE 12

$$2\Phi = \begin{bmatrix} 2 & & & & & & & \\ & 1-i & & & & & 1+i & \\ & & 1-i & & & & & 1+i \\ & & & 1-i & & & & 1+i \\ & & & & 1-i & & 1+i & \\ & & & & & 1-i & 1+i & \\ & & & & & 1-i & 1+i & \\ & & & & 2 & & & \\ & 1+i & & & & & 1-i & \\ & 1+i & & & & & & 1-i \\ & 1+i & & & & & & 1-i \\ & 1+i & & & & & 1-i & \\ & 1+i & & & & 1-i & & \\ & 1+i & & & & 1-i & & \\ & 1+i & & & & & 1-i & \end{bmatrix}$$

In the above TABLE 10 and TABLE 11, $C_n$ and $S_n$ are the level-dependent abbreviations for Eq. (6) and Eq. (7), respectively and $K_n = C_n + S_n$.

For $[L_3]$ of TABLE 10, $C_n$ and $S_n$ correspond to the $C_{4,h}$ and $S_{4,h}$ values of Eq. (6) and Eq. (7) where $n=h=0, 1, \ldots, 7$.

For $[L_4]$ of TABLE 11, $C_n$ and $S_n$ correspond to the $C_{5,h}$ and $S_{5,h}$ values of Eq. (6) and Eq. (7) where $n=h=0, 1, \ldots, 15$.

The matrix representation offers a different way of viewing the Fast Bracewell Transform. For example, $L_4$ shows the retrograde indexing of the sine factors as elements on lines of slope 45°. $L_1$ and $L_2$ do not have such elements at all. One might also notice that $L_1$ and $L_2$ have only 2N nonzero elements compared with 3N in the limit for factors of higher level.

Convolution

In the vast majority of image processing applications, convolution is carried out between two functions of which one is symmetrical. Since two-dimensional convolution performed on an image can be reduced to one dimension by spreading the image out serially as in a television waveform, it will suffice here to speak in terms of one dimension. Under conditions where $f_1(\tau)$ has no particular symmetry and is to be convolved with $f_2(\tau)$ which is an even function, the convolution theorem for the DBT is as follows:

$$f_1(\tau) * f_2(\tau) \text{ has DBT } H_1(\nu)H_2(\nu). \qquad \text{Eq. (11)}$$

In other words, the DBT of a convolution of this type is the product of two separate Discrete Bracewell Transforms. Therefore, to perform convolution, we take the two DBTs, multiply them together term by term, and take the DBT again. This procedure represents an improvement over taking the two DBTs, multiplying the complex values together and inverting, since one complex multiplication, $$(a+ib)(c+id) = ac - bd + i(ad+bc),$$

stands for four real multiplications for the DFT.

In the general case where $f_2(\tau)$ is not symmetrical, the convolution theorem has a second term, let $H_2(\nu) = H_{2e}(\nu) + H_{2o}(\nu)$ where $H_{2e}$ and $H_{2o}$ are the even and odd parts of $H_2(\nu)$. If $f_2(\tau)$ were symmetrical then the odd part of $H_{2o}(\nu)$ would be zero. The general convolution theorem then reads as follows:

$$f_1(\tau) * f_2(\tau) - H_1(\nu)H_{2e}(\nu) + H_1(-\nu)H_{2o}(\nu). \qquad \text{Eq. (12)}$$

This theorem is deducible from the convolution theorem for the DFT.

Eight-Element Computer—FIG. 3

One specific embodiment of a computer for performing transforms is shown in FIG. 3. In FIG. 3, the permute unit 4 receives the $F_{0,j}$ input data values (specifically, the eight input data values $F_{0,0}, F_{0,1}, \ldots, F_{0,7}$) on the eight input data lines 12. In one embodiment, the permute unit 4 can be a simple electrical cross-connector which by cross-connection operates to reorder the input data values as indicated hereinafter in TABLE 13 and TABLE 14. Each of the input lines 12 is a multi-bit bus where the number of lines forming the bus is equal to the number of bits representing each data element. For example, each one of the lines 12 can be a 16-bit bus.

In an alternative embodiment, the permute unit 4 includes a plurality of 8-way (N-way) selection gates, one gate for each of the eight (N) input data values. The selection gates are under control of gate control 14 for selecting the outputs in the manner indicated in connection with TABLE 13 and TABLE 14. Control 14, in one embodiment, includes a processor for executing the program routine of CHART 1 in order to cause the desired permutation of data values. In such an embodiment, the number, N, of data elements can be any size desired.

The output $F_{i,j}$ data values from the permute unit 4 are latched into registers 15 which provide the permuted data elements as inputs to the second stage 3. In the second stage, for the eight-element example described, four sum and difference adders 5-1, 5-2, 5-3 and 5-4 are included. The sum and difference adders 5-1 through 5-4 provide the equivalent of the calculations set forth in TABLE 14. The adder 5-1 receives the $F_{1,0}$ and the $F_{1,1}$ inputs from the permute unit 4. The $F_{2,0}$ output is the sum of the $F_{1,0}$ and $F_{1,1}$ inputs. The $F_{2,1}$ output from the adder 5-1 is the difference $F_{1,0} - F_{1,1}$. These two outputs correspond to the calculation indicated by the first two equations of TABLE 14. Note that in TABLE 14, in accordance with Eq. (6), the value of $C_{2,0}$ is $+1$ and the value of $C_{2,1}$ is $-1$. Also, the values of $S_{2,0}$ and $S_{2,1}$ are both 0. Accordingly, the TABLE 2 equations are reduced to the sum and difference terms which are calculated by the adders 5-1 through 5-4 of FIG. 3. Accordingly, no explicit multiplication by sine and cosine factors is required.

The outputs from the adders 5-1, ..., 5-4 are latched into registers 16. The registers 16 in turn provide inputs to the third stage. The third stage includes the adder units 6-1 and 6-2. Each adder unit includes two sum and difference adders. In the unit 6-1, the first adder forms the sum of the $F_{2,0}$ and $F_{2,2}$ inputs to provide the $F_{3,0}$ output. The same adder receives the same inputs and provides the difference output $F_{3,2}$.

In a similar manner, the second one of the two adders in the unit 6-1 receives the $F_{2,1}$ and $F_{2,3}$ inputs and provides the sum output $F_{3,1}$ and the difference output $F_{3,3}$.

In a similar manner, the second adder unit 6-2 provides the sum outputs $F_{3,4}$ and $F_{3,5}$ and the difference outputs $F_{3,6}$ and $F_{3,7}$.

The third stage 6 essentially provides the calculations indicated in TABLE 15. Note that, in TABLE 15, the value of the cosine terms in accordance with Eq. (6) has $C_{3,0} = +1$, $C_{3,1}$ and $C_{3,3} = 0$, and $C_{3,2} = -1$. Similarly, in accordance with Eq. (7), the sine terms $S_{3,0}$ and $S_{3,2}$ are equal to 0, $S_{3,1}$ is equal to $+1$ and $S_{3,3}$ is equal to $-1$. With these values of the sine and cosine terms, the calculations indicated in TABLE 15 reduce to the sum and difference calculations provided by the adder units 6-1 and 6-2 of FIG. 3. Accordingly, the third stage requires no explicit multiplication by sine and cosine factors.

The outputs from the adder units 6-1 and 6-2 are latched into registers 17 at the input of the fourth stage.

The fourth stage 7 performs the calculations indicated in connection with TABLE 16.

The fourth stage 7 essentially performs the calculations of TABLE 17. In FIG. 3, the lines 19 for the data values $F_{3,0}$, $F_{3,1}$, $F_{3,2}$ and $F_{3,3}$ are utilized twice and represent the terms under the column $F_{3,e}$ of TABLE 17. The lines 20 represent the factors in the column $F_{3,f}$ of TABLE 17. These terms are multiplied by the cosine factors $C_{4,0}, \ldots, C_{4,7}$.

In FIG. 3, the lines 21 represent the terms $F_{3,4}, \ldots, F_{3,7}$. The permuting unit 22 reverses the order of the terms $F_{3,5}$, $F_{3,6}$, $F_{3,7}$ as represented by the column $F_{3,g}$ in TABLE 17. Permuting unit 22 is similar to permuting unit 4 and like unit 4 is implemented in hardware, for example, electrical cross-connections or as gate-controlled cross-connections. In one implementation, cross-connections from registers 17 [for $F_{3,4}$, $F_{3,5}$, $F_{3,6}$ and $F_{3,7}$] to the inputs of multipliers 24 are made without need of an explicit permute unit 22.

The multiplier unit 23 performs the eight, two-input multiplies of the cosine terms. Similarly the multiplier unit 24 multiplies the eight, two-input multiplies of the sine terms.

The sine and cosine terms on lines 38 and 39 are provided by trig generator 2. In one embodiment, generator 2 includes a sine store 51 and a cosine store 52 each storing precalculated values of the required sine and cosine factors.

In one embodiment, the multipliers 23 and 24 are each implemented in hardware as eight 2-input multiplier stages. Each stage of multiplier 23 for example, receives one of the eight data lines 20 and one of the eight cosine lines 38 and connects the product on one of the eight lines 40 to unit 25, register 45.

In a preferred embodiment, however, the multiplier units 23 and 24 are simplified. The $C_{4,2}$, $C_{4,6}$, $S_{4,0}$ and $S_{4,4}$ terms are all 0 in accordance with Eq. (6) and Eq. (7). Similarly the terms $C_{4,0}$ and $S_{4,2}$ are equal to $+1$ and the $C_{4,4}$ and $S_{4,6}$ terms are $-1$ and similarly require no multiply or its equivalent. The values for all of the remaining sine and cosine factors are $+$ or $- (0.5)^{\frac{1}{2}}/2$. Multiplication for those remaining factors is carried out in any convenient way, for example, utilizing two-input multiplier stages, but only where multiplication is required.

The adder unit (COMBINE) 25 performs eight, three-input adds corresponding to the eight equations of TABLE 17. Unit 25 in one embodiment, is constructed as eight, three-input adders. Each three-input adder receives one of the lines 19, one of the lines 40 and one of the lines 41 and provides one of the output lines 41. Typically, lines 40 and lines 41 are input to registers 45 and 46, respectively, which inturn have outputs which effectivley connect lines 40 and 41 as inputs to the adders.

The output from the combine unit 25 provides the unnormalized signals $F_{4,0}, \ldots, F_{4,7}$. These eight outputs are divided by the value of N (N=8). In the embodiment of FIG. 3, the division is carried out by the shifter 26 which shifts each of the outputs by P bits. In the example of FIG. 3, P is equal to three so that shifter 26 is a three-bit shifter.

In the FIG. 3 system, the data is latched into the registers 15, 16 17, 45 and 46 and is latched and shifted in shifter 26 by clock signals from clock 47.

Eight-Element Computer Operation

In order to illustrate the operation of the FIG. 3 discrete transform computer, let the given input data sequence $F_{0,j}$ be $f(\tau) = [1\ 2\ 3\ 4\ 5\ 6\ 7\ 8]$. Permutation can proceed in $P-1$ steps or directly by the cross-connection of FIG. 3. The first step is to bisect the data into the two odd and even four-element segments [1 3 5 7] and [2 4 6 8], as in the column headed "$\pi$" in TABLE 13. The second step separates each four-element segment into two two-element sements [1 5], [3 7], [2 6] and [4 8]. As P=3, the second step is the last step of the bisecting permutation.

TABLE 13

| $\tau$ | $f(\tau)$ | $\pi$ | $f_0(\tau)$ | $f_1(\tau)$ | $f_2(\tau)$ | $f_3(\tau)$ | $H(\nu)$ | $\nu$ |
|---|---|---|---|---|---|---|---|---|
| 0 | 1 | 1 | 1 | 6 | 16 | 36 | 4.5 | 0 |
| 1 | 2 | 3 | 5 | −4 | −8 | −13.6 | −1.7 | 1 |
| 2 | 3 | 5 | 3 | 10 | −4 | −8 | −1 | 2 |
| 3 | 4 | 7 | 7 | −4 | 0 | −5.6 | −0.7 | 3 |
| 4 | 5 | 2 | 2 | 8 | 20 | −4 | −0.5 | 4 |
| 5 | 6 | 4 | 6 | −4 | −8 | −2.4 | −0.3 | 5 |
| 6 | 7 | 6 | 4 | 12 | −4 | 0 | 0 | 6 |

TABLE 13-continued

| $\tau$ | $f(\tau)$ | $\pi$ | $f_0(\tau)$ | $f_1(\tau)$ | $f_2(\tau)$ | $f_3(\tau)$ | $H(\nu)$ | $\nu$ |
|---|---|---|---|---|---|---|---|---|
| 7 | 8 | 8 | 8 | −4 | 0 | 5.6 | 0.7 | 7 |

The sequence [1 5 3 7 2 6 4 8] is the permuted sequence $f_0(\tau)$. Each two-element segment [a b] is now transformed; thus [1 5] gives $\frac{1}{2}[6-4]$, but the factor $\frac{1}{2}$ is suppressed until the end. When concatenated these elementary transforms constitute the first stage $F_{1,j}$ values $f_1(\tau) = [6\ -4\ 10\ -4\ 8\ -4\ 12\ -4]$. Owing to the degeneracy of the sine and cosine factors exhibited in TABLE 15, the steps for obtaining $f_2(\tau)$ are very simple. Thus $16-6+10$, $-8=-4-4$, $-4=6-10$, $0=4+4$, and so forth. In the final stage, computation of $F_3(\tau)$ involves sines and cosines of eighths of a turn. In adder unit 25 there are three sets of eight inputs each and one set of eight outputs. The first of the eight outputs is the sum of the first elements of the three input sets and similarly for the others.

In the FIG. 3 apparatus, a factor $\frac{1}{2}$ was suppressed P times so the result $F_3(\tau)$ must be divided by 8 to conclude that the input sequence [1 2 3 4 5 6 7 8] had DBT [4.5 −1.7 −1 −0.7 −0.5 −0.3 0 0.7].

The equations for the four stages of the discrete transform computer of FIG. 3 are represented by the following TABLE 14, ..., TABLE 17. Evaluation of the eight equations in each TABLE 14, ..., TABLE 17 results in the DBT of TABLE 13.

TABLE 14

| (Stage 1) |
|---|
| $F_{1,0} = F_{0,0}$ |
| $F_{1,1} = F_{0,4}$ |
| $F_{1,2} = F_{0,2}$ |
| $F_{1,3} = F_{0,6}$ |
| $F_{1,4} = F_{0,1}$ |
| $F_{1,5} = F_{0,5}$ |
| $F_{1,6} = F_{0,3}$ |
| $F_{1,7} = F_{0,7}$ |

TABLE 15

| | | (Stage 2) | | | | |
|---|---|---|---|---|---|---|
| q | $F_{2,j}$ | = $F_{1,e}$ | + $(F_{1,f})$ | $(C_{2,h})$ | + $(F_{1,g})$ | $(S_{2,h})$ |
| 0 | $F_{2,0}$ | = $F_{1,0}$ | + $(F_{1,1})$ | $(C_{2,0})$ | + $(F_{1,1})$ | $(S_{2,0})$ |
| 0 | $F_{2,1}$ | = $F_{1,0}$ | + $(F_{1,1})$ | $(C_{2,1})$ | + $(F_{1,1})$ | $(S_{2,1})$ |
| 1 | $F_{2,2}$ | = $F_{1,2}$ | + $(F_{1,3})$ | $(C_{2,0})$ | + $(F_{1,3})$ | $(S_{2,0})$ |
| 1 | $F_{2,3}$ | = $F_{1,2}$ | + $(F_{1,3})$ | $(C_{2,1})$ | + $(F_{1,3})$ | $(S_{2,1})$ |
| 2 | $F_{2,4}$ | = $F_{1,4}$ | + $(F_{1,5})$ | $(C_{2,0})$ | + $(F_{1,5})$ | $(S_{2,0})$ |
| 2 | $F_{2,5}$ | = $F_{1,4}$ | + $(F_{1,5})$ | $(C_{2,1})$ | + $(F_{1,5})$ | $(S_{2,1})$ |
| 3 | $F_{2,6}$ | = $F_{1,6}$ | + $(F_{1,7})$ | $(C_{2,0})$ | + $(F_{1,7})$ | $(S_{2,0})$ |
| 3 | $F_{2,7}$ | = $F_{1,6}$ | + $(F_{1,7})$ | $(C_{2,1})$ | + $(F_{1,7})$ | $(S_{2,1})$ |

TABLE 16

| | | (Stage 3) | | | | |
|---|---|---|---|---|---|---|
| q | $F_{3,j}$ | = $F_{2,e}$ | + $(F_{2,f})$ | $(C_{3,h})$ | + $(F_{2,g})$ | $(S_{3,h})$ |
| 0 | $F_{3,0}$ | = $F_{2,0}$ | + $(F_{2,2})$ | $(C_{3,0})$ | + $(F_{2,2})$ | $(S_{3,0})$ |
| 0 | $F_{3,1}$ | = $F_{2,1}$ | + $(F_{2,3})$ | $(C_{3,1})$ | + $(F_{2,3})$ | $(S_{3,1})$ |
| 0 | $F_{3,2}$ | = $F_{2,0}$ | + $(F_{2,2})$ | $(C_{3,2})$ | + $(F_{2,2})$ | $(S_{3,2})$ |
| 0 | $F_{3,3}$ | = $F_{2,1}$ | + $(F_{2,3})$ | $(C_{3,3})$ | + $(F_{2,3})$ | $(S_{3,3})$ |
| 1 | $F_{3,4}$ | = $F_{2,4}$ | + $(F_{2,6})$ | $(C_{3,0})$ | + $(F_{2,6})$ | $(S_{3,0})$ |
| 1 | $F_{3,5}$ | = $F_{2,5}$ | + $(F_{2,7})$ | $(C_{3,1})$ | + $(F_{2,7})$ | $(S_{3,1})$ |
| 1 | $F_{3,6}$ | = $F_{2,4}$ | + $(F_{2,6})$ | $(C_{3,2})$ | + $(F_{2,6})$ | $(S_{3,2})$ |
| 1 | $F_{3,7}$ | = $F_{2,5}$ | + $(F_{2,7})$ | $(C_{3,3})$ | + $(F_{2,7})$ | $(S_{3,3})$ |

TABLE 17

(Stage 4)

| q | $F_{4,j}$ | = | $F_{3,e}$ | + | $(F_{3,f})$ | $(C_{4,h})$ | + | $(F_{3,g})$ | $(S_{4,h})$ |
|---|---|---|---|---|---|---|---|---|---|
| 0 | $F_{4,0}$ | = | $F_{3,0}$ | + | $(F_{3,4})$ | $(C_{4,0})$ | + | $(F_{3,4})$ | $(S_{4,0})$ |
| 0 | $F_{4,1}$ | = | $F_{3,1}$ | + | $(F_{3,5})$ | $(C_{4,1})$ | + | $(F_{3,7})$ | $(S_{4,1})$ |
| 0 | $F_{4,2}$ | = | $F_{3,2}$ | + | $(F_{3,6})$ | $(C_{4,2})$ | + | $(F_{3,6})$ | $(S_{4,2})$ |
| 0 | $F_{4,3}$ | = | $F_{3,3}$ | + | $(F_{3,7})$ | $(C_{4,3})$ | + | $(F_{3,5})$ | $(S_{4,3})$ |
| 0 | $F_{4,4}$ | = | $F_{3,0}$ | + | $(F_{3,4})$ | $(C_{4,4})$ | + | $(F_{3,4})$ | $(S_{4,4})$ |
| 0 | $F_{4,5}$ | = | $F_{3,1}$ | + | $(F_{3,5})$ | $(C_{4,5})$ | + | $(F_{3,7})$ | $(S_{4,5})$ |
| 0 | $F_{4,6}$ | = | $F_{3,2}$ | + | $(F_{3,6})$ | $(C_{4,6})$ | + | $(F_{3,6})$ | $(S_{4,6})$ |
| 0 | $F_{4,7}$ | = | $F_{3,3}$ | + | $(F_{3,7})$ | $(C_{4,7})$ | + | $(F_{3,5})$ | $(S_{4,7})$ |

Computer Program

A Fast Bracewell Transform program that also gives the Fourier transform is given in the following TABLE 18.

The following explanatory program computes the DBT of an N-element data set, where N is between 2 and 512, and places it in F(P,), where $P = \log_2 N$. The real and imaginary parts of the DFT appear in R( ) and X( ).

The User furnishes the $2^P$ data values and changes line 50 to the appropriate value of P, where P is between 1 and 9. Data in algebraic form may be expressed on line 70 by substituting any desired function for the sample function I+1. For numerical data, append the necessary DATA statements, delete lines 70−90 and change line 1010 to read FOR I=0 TO N7 @ READ F(0,I) @ F(I,1)=F(0,I) @ NEXT I.

The program is written for clarity rather than for speed. However, careful practice is exemplified. For example, in subroutine 7000 where the DFT is obtained from the DBT (DHT), two divisions by 2 are avoided (by relegation to the display subroutine 8000) and a multiplication by 2 is handled by addition.

Note that @ stands for a semicolon between separate statements under the one line number, that ! stands for RE, (remark) and that the subroutine on line 8000 that tabulates the results needs adapting to local circumstances. Running time to completion of the DFT is assigned to the variable TO and is printed out at the end (see sample). Time taken by the HP-85 for N=256 will be 2 minutes or in general 0.06 NP seconds.

If P is greater than 8, the 32K memory of the HP-85 overflows. On a machine with more memory, change line 20 to read DIM(P,$2^P$); alternatively, edit to reuse the arrays.

TABLE 18

Copyright © 1985 The Board of Trustees of the Leland Stanford Junior University

```
10  !    "FHTBAS"
20  DIM F(8,256) ! Hartley
30  DIM R(129),X(129) ! Fourier
40  DIM S(256), C(256) ! sin & cos
50  P=3 ! 1<P<9
60  N4=2^(P-2) @ N2=N4+N4 @ N=N2
    +N2 @ N7=N-1 @ P7=P-1
70  DEF FN F(I)
80  FN F=I+1 ! Sample function
90  FN END
100 TO=TIME ! Start timer
110 GOSUB 1000 ! Insert data
120 GOSUB 2000 ! Get powers of 2
130 GOSUB 3000 ! Get C() & S()
140 GOSUB 4000 ! Permute
150 GOSUB 5000 ! Stages 1 & 2
160 GOSUB 6000 ! Stages 3,4...8
170 GOSUB 7000 ! Get DFT
180 TO=TIME-TO ! Stop timer
190 GOSUB 8000 ! Show results
200 END 1000 ! Subr Insert data
1010 FOR I=0 TO N7 @ F(0,I),F(1,
     I)=FNF(I) @ NEXT I
1020 RETURN
1550 NEXT I
2000 ! Subr Get powers of 2
2010 I=1 @ M(0)=1 @ M(1)=2
2020 M(I+1)=M(I)+M(I)
2030 I=I+1
2040 IF I<P THEN GOTO 2020
2050 RETURN
3000 ! Subr Get sines & cosines
3010 W=2*PI/N @ A=0
3020 FOR I=1 TO N @ A=A+W @ S(I)
     =SIN(A) @ C(I)=COS(A) @ NEX
     T I
3030 RETURN
4000 ! Subr Permute
4010 J, I=−1
4020 I=I+1 @ T=P
4030 T=T−1 @ J=J−M(T)
4040 IF J>=−1 THEN GOTO 4030
4050 J=J+M(T+1)
4060 IF I<=J THEN GOTO 4020
4070 T=F(0,I+1)
4080 F(0,I+1)=F(0,J+1)
4090 F(0,J+1)=T
4100 IF I<N−3 THEN GOTO 4020
4110 RETURN
5000 ! Subr Stages 1 & 2
5010 ! Get F(1,I), 2 element DFTs
5020 FOR I=0 TO N−2 STEP 2
5030   F(1,I)=F(0,I)+F(0,I+1)
5040   F(1,I+1)=F(0,I)−F(0,I+1)
5050 NEXT I
5060 IF P=1 THEN GOTO 170 ! Done
5070 ! Get F(2,I), 4 element DFTs
     using Table B
5080 L,M=2
5090 FOR I=0 TO N−4 STEP 4
5100   F(2,I)=F(1,I)+F(1,I+2)
5110   F(2,I+1)=F(1,I+1)+F(1,I+3)
5120   F(2,I+2)=F(1,I)−F(1,I+2)
5130   F(2,I+3)=F(1,I+1)−F(1,I+3)
5140 NEXT I
5150 IF P=2 THEN GOTO 170 ! Done
5160 RETURN
6000 ! Subr Stages 3,4...8
6010 U=P7
6020 S=4
6030 FOR L=2 to P7
6040   S2=S+S
6050   U=U−1
6060   S0=M(U−1)
6070   FOR Q=0 TO N7 STEP S2
6080     I=Q
6090     D=I+S
6100     F(L+1,I)=F(L,I)+F(L,D)
6110     F(L+1,D)=F(L,I)−F(L,D)
6120     K=D−1
6130     FOR J=S0 TO N4 STEP S0
6140       I=I+1
6150       D=I+S
6160       E=K+S
6170       Y=F(L,D)*C(J)+F(L,E)*S(J)
6180       Z=F(L,D)*S(J)−F(L,E)*C(J)
6190       F(L+1,I)=F(L,I)+Y
6200       F(L+1,D)=F(L,I)−Y
6210       F(L+1,K)=F(L,K)+Z
6220       F(L+1,E)=F(L,K)−Z
```

TABLE 18-continued

Copyright © 1985 The Board of Trustees of the Leland Stanford Junior University

```
6230      K=K−1
6240    NEXT J
6250      E=K+S
6260    NEXT Q
6270    S=S2
6280  NEXT L
6290  RETURN
7000  ! Subr Get DFT
7010   R(0)=F(L,0)+F(L,0) @ X(0)=0
7020   FOR I=1 TO N2
7030    B=F(L,N−I)
7040    R(I)=F(L,I)+B
7050    X(I)=F(L,I)−B
7060   NEXT I
7070  RETURN
8000  ! Subr Show results
8010   CLEAR @ PRINT @ PRINT "τ,ν f(τ)
        H(ν)   R(ν) + j X(ν)"@PRINT
8020   J$=""
8030   FOR I=0 TO N7
8040     J=MIN(I,N−I) ! Reflect
8050     F=INT(.5+1000*FNF(I))/1000
8060     H=INT(.5+1000/N*F(L,I))/1000
8070     R=INT(.5+1000*R(J)/N)/2000
         @ X=INT(.5+1000*X(J)/N)/2000
         *SGN(N2−I)
8080     J$="+j "&VAL$(ABS(X)) @ IF
         SGN(X)=−1 THEN J$="−j
         "&VAL
         $(ABS(X))
8090     IF X =0 THEN J$=""
8100     PRINT I;TAB(6);F;TAB(12);H;
         TAB(21);R;J$
8110   NEXT I
8120   PRINT @ PRINT "N="&VAL$(N)
        &", Time was "&VAL$(TO)&
        "sec"
8130  RETURN
```

| τ,ν | f(τ) | H(ν)   | R(ν) | +j | X(ν)  |
|-----|------|--------|------|----|-------|
| 0   | 1    | 4.5    | 4.5  |    |       |
| 1   | 2    | −1.707 | −.5  | −j | 1.207 |
| 2   | 3    | −1     | −.5  | −j | .5    |
| 3   | 4    | −.707  | −.5  | −j | .207  |
| 4   | 5    | −.5    | −.5  |    |       |
| 5   | 6    | −.293  | −.5  | +j | .207  |
| 6   | 7    | 0      | −.5  | +j | .5    |
| 7   | 8    | .707   | −.5  | +j | 1.207 |

N=8, Time was 1.436 sec

The present invention has been described employing several mathematical representations, but the invention is not limited to any particular representation. The interrelationship between time and frequency in connection with transforms is well known and it will be clear to those skilled in the art that the present invention covers decimation in frequency as well as decimation in time.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A method of performing a discrete transform on an input sequence of N input data values, $F_{0,j}$, where N is equal to $2^P$, where P is a positive integer and where j has values from 0 to N−1, comprising, permuting in permuting means the input sequence, $F_{0,j}$, with a bisecting permutation to form a permuted sequence, $F_{1,j}$, processing in processing means said permuted sequence in P subsequent stages s where s has values from 2 to P+1, where the outputs from one stage form the inputs for the next stage and where each stage calculates N values of $F_{s,j}$ as a function of direct values from the previous s−1 stage, as a function of values from the previous s−1 stage multiplied by cosine factors to form cosine terms, and as a function of values from the previous s−1 stage multiplied by sine factors to form sine terms whereby the transformed data values, $F_{P+1,j}$, are provided from the P+1 stage.

2. The method of claim 1 wherein said processing means includes a first stage, with s equal to 2 of said P subsequent stages, said first stage including means to form sum and difference values from sequential pairs of the permuted sequence values to form the N output values from said first stage without need for explicit multiplication by said sine or cosine factors.

3. The method of claim 2 wherein a second stage of said P subsequent stages of said processing means forms sum and difference values from alternate output values from said first stage to form the N output values from said second stage without need for explicit multiplication by said sine or cosine factors.

4. The method of claim 3 wherein each stage s after said second stage forms each said cosine factor $C_{s,h}$ and each said sine factor $S_{s,h}$ as follows:

$$C_{s,h} = \cos(2\pi h/2^{s-1})$$

$$S_{s,h} = \sin(2\pi h/2^{s-1})$$

where, $h = 0, \ldots, (2E-1)$
$E = 2^{s-2}$.

5. The method of claim 1 wherein said processing step includes the step of dividing each output for the P+1 stage by N.

6. The method of claim 1 wherein said processing step includes for one or more of said subsequent stages after the second stage the steps of adding said direct value, said cosine term and said sine term to form each value of $F_{s,j}$.

7. The method of claim 1 further including the step of forming said input data values, $F_{0,j}$, as discrete values in one or more data collection steps.

8. The method of claim 1 further including the step of processing said transformed data values, $F_{P+1,j}$, in one or more utilization steps.

9. The method of claim 1 further including the step of converting the transformed data values to Fourier transforms.

10. The method of claim 1 wherein said bisecting permutation comprises, bisecting each sequence, starting with said input sequence, into odd and even segments and reordering said segments with said odd segment followed by said even segment to form a reordered sequence, repeating said bisecting by bisecting each segment of the reordered sequence to form new odd and even segments of each segment and reordering each new odd and even segment with the odd segment followed by the even segment to form the next reordered sequence, repeating said bisecting until P−1 reordered sequences have been formed whereby the $(P-1)^{th}$ reordered sequence is the bisected permuted sequence.

11. A method of computation employing an input sequence of N input data values, $F_{0,j}$, where N is equal to $2^P$, where P is a positive integer and where j has values from 0 to N−1, comprising, permuting in permuting means the input sequence, $F_{0,j}$, with a bisecting permutation to form a permuted sequence, $F_{1,j}$, processing in processing means said permuted sequence in P subsequent stages s where s has values from 2 to P+1, where the output from one stage forms the input for the next stage and where each stage calculates N values of $F_{s,j}$ as a function of direct values $F_{s-1,e}$ from the previous s−1 stage, as a function of values $F_{s-1,f}$ from the previous s−1 stage multiplied by a cosine factor $C_{s,h}$ and as a function of values from the previous s−1 stage multiplied by a sine factor $S_{s,h}$ where $F_{s,j}$ is calculated as follows:

$$F_{s,j} = [F_{s-1,e} + (F_{s-1,f})(C_{s,h}) + (F_{s-1,g})(S_{s,h})]_q$$

where,
N = number of data elements = $2^P$
s = stage number = 2, ..., T
T = total number of stages = P+1
Q = N/(2E) = number of pairs of sets of equations in a stage
q = 0, 1, ..., (Q−1)
E = $2^{s-2}$ = number of equations in each set of each pair
$e = [0 + (2E)(q)], \ldots, [(E-1) + (2E)(q)]$
$f = e + E$
$g = f$ when $h = 0$ and also when $f = f]_{h=0}$
$g = K - f$ when $h \neq 0$ where K is a constant equal to $(2g]_{h=0} + E$
$h = 0, \ldots, (2E-1)$
  for first set of pair $h = 0, \ldots, (2E-1)$
  for second set of pair $h = 0, \ldots, (2E-1)$
$j = p + h = 0, 1, \ldots, (N-1)$
$C_{s,h} = \cos(2\pi h/2^{s-1})$
$S_{s,h} = \sin(2\pi h/2^{s-1})$.

12. The method of claim 11 wherein said processing means includes a first stage with s equal to 2 of said P subsequent stages, said first stage including means to form sum and difference values from sequential pairs of the permuted sequence values to form the N output values from said first stage without need for explicit multiplication by said sine or cosine factors.

13. The method of claim 12 wherein the second stage of said P subsequent stages of said processing means forms sum and difference values from alternate output values from said first stage to form the N output values from said second stage without need for explicit multiplication by said sine or cosine factors.

14. The method of claim 11 wherein each stage s after said second stage forms each said cosine factor $C_{s,h}$ and each said sine factor $S_{s,h}$ as follows:

$$C_{s,h} = \cos(2\pi h/2^{s-1})$$

$$S_{s,h} = \sin(2\pi h/2^{s-1})$$

where,
$h = 0, \ldots, (2E-1)$
$E = 2^{s-2}$.

15. The method of claim 11 wherein said processing step performs the step of dividing each output for the P+1 stage by N.

16. The method of claim 11 wherein said processing includes for one or more of said subsequent stages after said second stage the steps of adding said direct value, said cosine term and said sine term to form each value of $F_{s,j}$.

17. The method of claim 11 further including the step of forming said input data values, $F_{0,j}$, as discrete values in one or more data collection steps.

18. The method of claim 11 further including the step of processing said transformed data values, $F_{P+1,j}$, in one or more utilization steps.

19. A method of performing a discrete transform on an input sequence of N input data values, $F_{0,j}$, where N is equal to $2^P$, and P is a positive integer where j has values from 0 to N−1, comprising, permuting in permuting means the input sequence, $F_{0,j}$, with a bisecting permutation to form a permuted sequence, $F_{1,j}$, processing in processing means said permuted sequence in P subsequent stages s where s has values from 2 to P+1, wherein the output from one stage forms the input for the next stage and wherein each stage calculates N values of $F_{s,j}$ as a function of direct values $F_{s-1,e}$ from the previous s−1 stage, as a function of values $F_{s-1,f}$ from the previous $s-1$ stage multiplied by a cosine factor $C_{s,h}$ to form a cosine term and as a function of values from the previous $s-1$ stage multiplied by a sine factor $S_{s,h}$ to form a sine term where $F_{s,j}$ is calculated by concurrently adding the direct value, the cosine term and the sine term as follows:

$$F_{s,j} = [F_{s-1,e} + (F_{s-1,f})(C_{s,h}) + (F_{s-1,g})(S_{s,h})]_q$$

where,

N = number of data elements = $2^P$
s = stage number = 2, ..., T
T = total number of stages = P+1
Q = N/(2E) = number of pairs of sets of equations in a stage
q = 0, 1, ..., (Q−1)
E = $2^{s-2}$ = number of equations in each set of each pair
$e = [0+(2E)(q)], ..., [(E-1)+(2E)(q)]$
$f = e + E$
g = f when h = 0 and also when f = f]$_{h=0}$
g = K−f when h≠0 where K is a constant equal to $(2g]_{h=0} + E$
h = 0, ..., (2E−1)
  for first set of pair h = 0, ..., (2E−1)
  for second set of pair h = 0, ..., (2E−1)
j = p+h = 0, 1, ..., (N−1)
$C_{s,h} = \cos(2\pi h/2^{s-1})$
$S_{s,h} = \sin(2\pi h/2^{s-2})$.

20. A method of performing a discrete transform $H(\nu)$ on an input sequence of N input data values, $F_{0,j}$ representing $f(\tau)$ where N is equal to $2^P$, and P is a positive integer where j is equal to $\tau$ and has values from 0 to N−1, and where the discrete transform is of the form $$H(\nu) = (N^{-1}) \sum_{\tau=0}^{N-1} f(\tau)\operatorname{cas}(2\pi\nu\tau/N)$$

where, $\operatorname{cas} \theta = \cos\theta + \sin\theta$ $\nu = 0, ..., N-1$ comprising, permuting in permuting means the input sequence $F_{0,j}$, with a bisecting permutation to form a permuted sequence, $F_{1,j}$, processing in processing means said permuted sequence in P subsequent stages s where s has values from 2 to P+1, where the output from one stage forms the input for the next stage and where each stage calculates N values of $F_{s,j}$ as a function of direct values $F_{s-1,e}$ from the previous s−1 stage, as a function of values $F_{s-1,f}$ from the previous s−1 stage multiplied by a cosine factor $C_{s,h}$ and as a function of values from the previous s−1 stage multiplied by a a sine factor $S_{s,h}$ where $F_{s,j}$ is calculated as follows:

$$F_{s,j} = [F_{s-1,e} + (F_{s-1,f})(C_{s,h}) + (F_{s-1,g})(S_{s,h})]_q$$

where,

N = number of data elements = $2^P$
s = stage number = 2, ..., T
T = total number of stages = P+1
Q = N/(2E) = number of pairs of sets of equations in a stage
q = 0, 1, ..., (Q−1)
E = $2^{s-2}$ = number of equations in each set of each pair
$e = [0+(2E)(q)], ..., [(E-1)+(2E)(q)]f = e+E$
g = f when h = 0 and also when f = f]$_{h=0}$
g = K−f when h≠0 where K is a constant equal to $(2g]_{h=0} + E$
h = 0, ..., (2E−1)
  for first set of pair h = 0, ..., (2E−1)
  for second set of pair h = 0, ..., (2E−1)
j = p+h = 0, 1, ..., (N−1)
$C_{s,h} = \cos(2\pi h/2^{s-1})$
$S_{s,h} = \sin(2\pi h/2^{s-1})$.

21. An apparatus for providing a discrete transform on an input sequence of N input data values, $F_{0,j}$, where N is equal to $2^P$, where P is a positive integer and where j is equal to values from 0 to N−1, comprising, means for permuting the input sequence, $F_{0,j}$, with a bisecting permutation to form a permuted sequence, $F_{1,j}$, processing means for processing said permuted sequence in P subsequent stages s where s has values from 2 to P+1, where the output from one stage forms the input for the next stage and where each stage calculates N values of $F_{s,j}$, for j equal to values from 0 to N−1, as a function of direct values from the previous s−1 stage, as a function of values from the previous s−1 stage multiplied by a cosine factor to form a cosine term, and as a function of values from the previous s−1 stage multiplied by a a sine factor to form a sine term whereby the transformed data values, $F_{P+1,j}$, are provided from the P+1 stage.

22. The apparatus of claim 21 wherein said processing means includes a first stage with s equal to 2 for said P subsequent stages, said first stage including adder means to form sum and difference values from sequential pairs of the permuted sequence values to form the N output values from said first stage without need for explicit multiplication by said sine or cosine factors.

23. The apparatus of claim 22 wherein said processing means includes a second stage of said P subsequent stages, said second stage including adder means to form sum and difference values from alternate output values from said first stage to form the N output values from said second stage without need for explicit multiplication by said sine or cosine factors.

24. The apparatus of claim 23 wherein each stage s after said second stage includes generator means to form each said cosine factor $C_{s,h}$ and each said sine factor $S_{s,h}$ as follows:

$C_{s,h} = \cos(2\pi h/2^{s-1})$ $S_{s,h} = \sin(2\pi h/2^{s-1})$ where,
h = 0, ..., (2E−1)
E = $2^{s-2}$.

25. The apparatus of claim 21 wherein said processing means includes means for dividing each output for the P+1 stage by N.

26. The apparatus of claim 21 wherein said processing means includes for one or more of said subsequent stages after the second stage adder means for adding said direct value, said cosine term and said sine term to form each value of $F_{s,j}$.

27. An apparatus for providing a discrete transform on an input sequence of N input data values, $F_{0,j}$, where N is equal to $2^P$, where P is a positive integer and where j is equal to values from 0 to N−1, comprising, permuting means for permuting the input sequence, $F_{0,j}$, with a bisecting permutation to form a permuted sequence, $F_{1,j}$, processing means for processing said permuted sequence, said processing means including P subsequent stages s where s has values from 2 to P+1, said processing means including connection means connecting the output from one stage as the input for the next stage and wherein each stage calculates N values of $F_{s,j}$ for j equal to values from 0 to N−1, said processing means including connection means for providing direct values $F_{s-1,e}$ from the previous s−1 stage, said processing means including multiplier means for multiplying values $F_{s-1,f}$ from the previous s−1 stage by a cosine factor $C_{s,h}$ to form a cosine term and said processing means including multiplier means for multiplying values from the previous s−1 stage by a sine factor $S_{s,h}$ to form a sine term, said processing means including adder means for adding terms to form $F_{s,j}$ as follows:

$$F_{s,j}=[F_{s-1,e}+(F_{s-1,f})(C_{s,h})+(F_{s-1,g})(S_{s,h})]_q$$

where,
N=number of data elements=$2^P$
s=stage number=2, ..., T
T=total number of stages=P+1
Q=N/(2E)=number of pairs of sets of equations in a stage
q=0,1, ..., (Q−1)
E=$2^{s-2}$=number of equations in each set of each pair
e=[0+(2E)(q)], ..., [(E−1)+(2E)(q)]
f=e+E
g=f when h=0 and also when f=$f]_{h=0}$
g=K−f when h≠0 where K is a constant equal to $(2g]_{h=0}+E$
h=0, ..., (2E−1)
   for first set of pair h=0, ..., (2E−1)
   for second set of pair h=0, ..., (2E−1)
j=p+h=0,1, ..., (N−1)
$C_{s,h}=\cos(2\pi h/2^{s-1})$
$S_{s,h}=\sin(2\pi h/2^{s-1})$.

28. The apparatus of claim 27 wherein said processing means including a first stage with s equal to 2 for said P subsequent stages, said first stage including adder means to form sum and difference values from sequential pairs of the permuted sequence values to form the N output values from said first stage without need for explicit multiplication by said sine or cosine factors.

29. The apparatus of claim 28 wherein said processing means includes a second stage of said P subsequent stages, said second stage including adder means to form sum and difference values from alternate output values from said first stage to form the N output values from said second stage without need for explicit multiplication by said sine or cosine factors.

30. The apparatus of claim 29 wherein each stage s after said second stage includes generator means to form each said cosine factor $C_{s,h}$ and each said sine factor $S_{s,h}$ as follows:

$$C_{s,h}=\cos(2\pi h/2^{s-1})$$

$$S_{s,h}=\sin(2\pi h/2^{s-1})$$

where,
h=0, ..., (2E−1)
E=$2^{s-2}$.

31. The apparatus of claim 27 wherein said processing means includes means for dividing each output for the P+1 stage by N.

32. The apparatus of claim 27, wherein said processing means includes for one or more of said subsequent stages after the second stage adder means for adding said direct value, said cosine term and said sine term to form each value of $F_{s,j}$.

33. The apparatus of claim 27 further including data collection means for forming said input data values, $F_{0,j}$, as discrete values.

34. The apparatus of claim 27 further including utilization means for processing said transformed data values, $F_{P+1,j}$.

35. An apparatus for providing a discrete transform on an input sequence of N input data values, $F_{0,j}$ representing $f(\tau)$ where N is equal to $2^P$, and P is a positive integer where j is equal to $\tau$ and has values from 0 to N−1, and where the discrete transform is of the form $$H(\nu) = (N^{-1})\sum_{\tau=0}^{N-1} f(\tau)\text{cas}(2\pi\nu\tau/N)$$

where,
cas $\theta \equiv \cos\theta + \sin\theta$
$\nu=0, ..., N-1$ comprising,
permuting means for permuting the input sequence $F_{0,j}$, with a bisecting permutation to form a permuted sequence, $F_{1,j}$, processing means for processing said permuted sequence, said processing means including P subsequent stages s where s has values from 2 to P+1, said processing means including connection means connecting the output from one stage as the input for the next stage and wherein each stage calculates N values of $F_{s,j}$ where j has values from 0 to N−1, said processing means including means for storing direct values $F_{s-1,e}$ from the previous s−1 stage, said processing means including multiplier means for multiplying values $F_{s-1,f}$ from the previous s−1 stage by a cosine factor $C_{s,h}$ to form a cosine term and said processing means including multiplier means for multiplying values from the previous s−1 stage by a sine factor $S_{s,h}$ to form a sine term, said processing means including adder means for adding said direct value, said cosine term and said sine term to form $F_{s,j}$ as follows:

$$F_{s,j}=[F_{s-1,e}+(F_{s-1,f})(C_{s,h})+(F_{s-1,g})(S_{s,h})]_q$$

where,
N=number of data elements=$2^P$
s=stage number=2, ..., T
T=total number of stages=P+1
Q=N/(2E)=number of pairs of sets of equations in a stage
q=0, 1, ..., (Q−1)
E=$2^{s-2}$=number of equations in each set of each pair $e = [0+(2E)(q)], \ldots, [(E-1)+(2E)(q)]$
$f = e + E$
$g = f$ when $h=0$ and also when $f=f]_{h=0}$
$g = K-f$ when $h \neq 0$ where K is a constant equal to $(2g]_{h=0}+E$
$h = 0, \ldots, (2E-1)$
  for first set of pair $h=0, \ldots, (2E-1)$
  for second set of pair $h=0, \ldots, (2E-1)$
$j = p+h = 0, 1, \ldots, (N-1)$
$C_{s,h} = \cos(2\pi h/2^{s-1})$
$S_{s,h} = \sin(2\pi h/2^{s-1})$.

36. The apparatus of claim 35 wherein said adder means is a three-input adder for each of said N values.

37. The apparatus of claim 35 wherein each of said subsequent stages includes register means for storing output values from the previous stage.

38. A method of performing a discrete transform on an input sequence of N real input data values, $F_{0,j}$, where N is equal to $2^P$, where P is a positive integer and where j has values from 0 to $N-1$, comprising,
  permuting with permuting means the input sequence, $F_{0,j}$, in a first stage with a bisecting permutation to form an N-numbered permuted sequence, $F_{1,j}$,
  processing with processing means said permuted sequence in P subsequent stages s where s has values from 2 to $P+1$, where the outputs from one stage form the inputs for the next stage, where the $s-1$ stage for each value of s from 2 to $P+1$ provides N-numbered outputs as inputs to the s stage, where the s equal 2 stage receives the $F_{1,j}$ sequence as an input, and where each stage calculates N values of $F_{s,j}$ as a function of direct values from the previous $s-1$ stage, as a function of first values $F_{s-1,f}$ from the previous $s-1$ stage multiplied by cosine factors $C_{s,h}$ to form cosine terms, and as a function of values from the previous $s-1$ stage multiplied by sine factors $C_{s,h}$ to form sine terms having retrograde indexes in that the indexes g and h for said sine terms change in opposite directions, whereby the transformed data values, $F_{P+1,j}$, are provided from the $P+1$ stage.

39. The method of claim 38 wherein said processing means includes a first stage, with s equal to 2 of said P subsequent stages, said first stage including means to form sum and difference values from sequential pairs of the permuted sequence values to form the N output values from said first stage without need for explicit multiplication by said sine or cosine factors.

40. The method of claim 39 wherein a second stage of said P subsequent stages of said processing means forms sum and difference values from alternate output values from said first stage to form the N output values from said second stage without need for explicit multiplication by said sine or cosine factors.

41. The method of claim 40 wherein each stage s after said second stage forms each said cosine factor $C_{s,h}$ and each said sine factor $[S_{2,h}]S_{s,h}$ as follows:

$C_{s,h} = \cos(2\pi h/2^{s-1})$ $S_{s,h} = \sin(2\pi h/2^{s-1})$ where,
$h = 0, \ldots, (2E-1)$
$E = 2^{s-2}$.

42. The method of performing a discrete transform $H(\nu)$ on an input sequence of N input data values, $f(\tau)$, where N is a positive integer including $2^P$, where P is a positive integer, and where $\tau$ has values from 0 to $N-1$, said method forming the transform $H(\nu)$ for each value of $\nu$ in accordance with the following sum for all values of $\tau$, $$(N^{-1}) \sum_{\tau=0}^{N-1} f(\tau)\text{cas}(2\pi\nu\tau/N)$$

where,
  cas $\theta \equiv \cos \theta + \sin \theta$
  $\theta = (2\pi\nu\tau/N)$
and said method including the steps of,
  permuting in permuting means the input data vaues, $f(\tau)$, with a bisecting permutation to form a permuted sequence,
  processing said permuted sequence in processing means using a plurality of stages where the outputs from one stage form the inputs for the next stage, said processing employing direct values from the previous stage, employing values from the previous stage multiplied by cosine factors to form cosine terms, and employing values from the previous stage multiplied by sine factors to form sine terms whereby the transformed data values are provided from the last one of said stages.

43. A method of performing a final transform of the convolution of first and second sequences of N input data values, $(F_{0,j})_1$ and $(F_{0,j})_2$ representing $f_1(\tau)$ and $F_2(\tau)$, designated $f_i(\tau)$, where $H_1(\nu)$ and $H_2(\nu)$, designated $H_i(\nu)$, are the discrete transforms of $f_1(\tau)$ and $f_2(\tau)$ where for $H_i(\nu)$ and $f_i(\tau)$ i is equal to 1 and 2, where for each of said sequences N is equal to $2^P$, and P is a positive integer where j is equal to $\tau$ and has values from 0 to $N-1$, where $f_2(\tau)$ is an even function and where the discrete transform $H_i(\nu)$ for i equal to 1 and 2 is of the form $$H_i(\nu) = (N^{-1}) \sum_{\tau=0}^{N-1} f_i(\tau)\text{cas}(2\pi\nu\tau/N)$$

where,
  cas $\theta \equiv \cos \theta + \sin \theta$
  $\nu = 0, \ldots, N-1$
  $i = 1, 2$
said method comprising,
  forming $H_i(\nu)$ for i equal to 1 and 2 by the steps of,
    permuting in permuting means the input sequence $(F_{0,j})_i$, with a bisecting permutation to form a permuted sequence, $(F_{1,j})_i$,
    processing in processing means said permuted sequence in P subsequent stages s where s has values from 2 to $P+1$, where the output from one stage forms the input for the next stage and where each stage calculates N values of $(F_{s,j})_i$ as a function of direct values $F_{s-1,e}$ from the previous $s-1$ stage, as a function of values $F_{s-1,f}$ from the previous $s-1$ stage multiplied by a cosine factor $C_{s,h}$ and as a function of values from the previous $s-1$ stage multiplied by a a sine factor $S_{s,h}$ where $(F_{s,j})_i$ is calculated for i equal to 1 and 2 as follows:

$(F_{s,j})_i = ([F_{s-1,e} + (F_{s-1,f})(C_{s,h}) + (F_{s-1,g})(S_{s,h})]_q)_i$ where,
N = number of data elements = $2^P$
s = stage number = $2, \ldots, T$ T = total number of stages = P+1

$Q = N/(2E)$ = number of pairs of sets of equations in a stage $q = 0, 1, \ldots, (Q-1)$ $E = 2^{s-2}$ = number of equations in each set of each pair $e = [0+(2E)(q)], \ldots, [(E-1)+(2E)(q)]$ $f = e+E$ $g = f$ when $h=0$ and also when $f = f]_{h=0}$ $g = K-f$ when $h \neq 0$ where K is a constant equal to $(2g]_{h=0} + E$ $h = 0, \ldots, (2E-1)$ for first set of pair $h = 0, \ldots, (2E-1)$ for second set of pair $h = 0, \ldots, (2E-1)$ $j = p+h = 0, 1, \ldots, (N-1)$ $C_{s,h} = \cos(2\pi h/2^{s-1})$ $S_{s,h} = \sin(2\pi h/2^{s-1})$ multiplying $H_1(\nu)$ and $H_2(\nu)$ to form $[H_1(\nu)][H_2(\nu)]$ as said final transform.

* * * * *